US011409728B2

(12) United States Patent
Sakaguchi et al.

(10) Patent No.: US 11,409,728 B2
(45) Date of Patent: Aug. 9, 2022

(54) MAP INFORMATION SYSTEM

(71) Applicant: TOYOTA JIDOSHA KABUSHIKI KAISHA, Toyota (JP)

(72) Inventors: Eiji Sakaguchi, Sunto-gun (JP); Yasuhiro Takagi, Susono (JP); Keisuke Hokai, Susono (JP); Yusuke Hayashi, Susono (JP); Taichi Kawanai, Susono (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 16/531,191

(22) Filed: Aug. 5, 2019

(65) Prior Publication Data
US 2020/0104290 A1 Apr. 2, 2020

(30) Foreign Application Priority Data

Oct. 2, 2018 (JP) .............................. JP2018-187590

(51) Int. Cl.
*G06F 16/23* (2019.01)
*G05D 1/02* (2020.01)
*G06F 16/29* (2019.01)

(52) U.S. Cl.
CPC ....... *G06F 16/2358* (2019.01); *G05D 1/0274* (2013.01); *G06F 16/29* (2019.01); *G05D 2201/0213* (2013.01)

(58) Field of Classification Search
CPC ... G06F 16/2358; G06F 16/29; G05D 1/0274; G05D 2201/0213
See application file for complete search history.

(56) References Cited

U.S. PATENT DOCUMENTS

| 8,554,469 | B2* | 10/2013 | Stahlin | G01C 21/32 |
| | | | | 701/409 |
| 10,818,175 | B2* | 10/2020 | Brookins | G08G 1/0969 |
| 10,935,385 | B2* | 3/2021 | Ohyama | G05D 1/021 |
| 2010/0241354 | A1 | 9/2010 | Stahlin et al. | |

(Continued)

FOREIGN PATENT DOCUMENTS

| JP | 2004-205379 A | 7/2004 |
| JP | 2011-503563 A | 1/2011 |

(Continued)

*Primary Examiner* — Hunter B Lonsberry
*Assistant Examiner* — Harrison Heflin
(74) *Attorney, Agent, or Firm* — Sughrue Mion, PLLC

(57) ABSTRACT

A map information system includes: an in-vehicle device that executes driving support control based on map information; an external device having external map information used for the driving support control; and an update determination device. The in-vehicle device further executes external update processing that updates first map information being the map information of a first area by using first external map information being the external map information of the first area. The update determination device calculates a change degree being a difference between the first map information and the first external map information, for each point or each area in the first area. The external update processing is prohibited with respect to a section in which the change degree is equal to or less than a threshold. The external update processing is permitted with respect to a section in which the change degree exceeds the threshold.

8 Claims, 24 Drawing Sheets

(56) References Cited

U.S. PATENT DOCUMENTS

| | | | | |
|---|---|---|---|---|
| 2018/0113459 A1* | 4/2018 | Bennie | .................. | G05D 1/028 |
| 2018/0188045 A1* | 7/2018 | Wheeler | .............. | G05D 1/0274 |
| 2021/0004363 A1* | 1/2021 | Bailly | .................. | G06F 16/235 |

FOREIGN PATENT DOCUMENTS

| | | | | |
|---|---|---|---|---|
| JP | 2012-117906 A | 6/2012 | | |
| JP | 2017-90548 A | 5/2017 | | |
| JP | 2017-100652 A | 6/2017 | | |
| JP | 2018-119909 A | 8/2018 | | |
| WO | WO-2013134959 A1 * | 9/2013 | ............. | G01C 21/32 |

* cited by examiner

<FEATURE OBJECT MAP INFORMATION FE_MAP>

| POSITION [Xs,Ys,Zs] [Xe,Ye,Ze] | EVALUATION INFORMATION (NUMBER OF MEASUREMENTS, VARIANCE ETC.) | EVALUATION VALUE | TIME STAMP |
|---|---|---|---|

<TERRAIN MAP INFORMATION TE_MAP>

| POSITION [X,Y] | HEIGHT Z | EVALUATION INFO. (NUMBER OF MEASUREMENTS, VARIANCE ETC.) | EVALUATION VALUE | TIME STAMP |
|---|---|---|---|---|

*Fig. 13*

MAP INFORMATION SYSTEM

BACKGROUND

Technical Field

The present disclosure relates to a technique for sharing map information used for driving support control that supports driving of a vehicle.

Background Art

Patent Literature 1 discloses an automated driving control system. The automated driving control system includes an in-vehicle system and an infrastructure. The in-vehicle system has advanced map information including map information and environment information. The environment information includes information on a travel state of another vehicle, road conditions, traffic conditions, and so forth. Such the environment information is generated by the infrastructure. The in-vehicle system communicates with the infrastructure and updates the advanced map information every time it acquires the environment information.

LIST OF RELATED ART

Patent Literature 1: Japanese Unexamined Patent Application Publication No. JP-2017-100652

SUMMARY

Map information is used in driving support control that supports driving of a vehicle. It is desirable that an in-vehicle device and an external device such as a management server share the map information. In this regard, there may be a case where a content of the map information is almost the same between the in-vehicle device side and the external device side. Therefore, it is inefficient to always execute update processing that updates the map information in the in-vehicle device or the external device.

An object of the present disclosure is to provide a technique that can efficiently update map information when an in-vehicle device and an external device shares the map information.

In an aspect of the present disclosure, a map information system is provided.

The map information system includes:

an in-vehicle device installed on a vehicle and configured to execute driving support control that supports driving of the vehicle based on map information;

an external device having external map information used for the driving support control; and an update determination device capable of accessing the in-vehicle device and the external device, The in-vehicle device includes:

a memory device in which the map information is stored; and a control device configured to execute the driving support control based on the map information stored in the memory device.

The control device is further configured to execute external update processing that updates first map information being the map information of a first area by using first external map information being the external map information of the first area.

The update determination device is configured to:

calculate a first change degree being a difference between the first map information and the first external map information, for each point or each area in the first area;

prohibit the external update processing with respect to a first update-prohibited section in which the first change degree is equal to or less than a first threshold; and permit the external update processing with respect to a first update-permitted section in which the first change degree exceeds the first threshold.

According to the present disclosure, the in-vehicle device executes the driving support control based on the map information. The external device has the external map information. The in-vehicle device further executes the external update processing that updates the first map information being the map information of the first area by using the first external map information being the external map information of the first area.

The update determination device calculates the first change degree being the difference between the first map information and the first external map information, for each point or each area in the first area. The update determination device permits the external update processing with respect to the first update-permitted section in which the first change degree exceeds the first threshold. Whereas, the update determination device prohibits the external update processing with respect to the first update-prohibited section in which the first change degree is equal to or less than the first threshold. Therefore, the external update processing having no significant effect on the map information is prevented from being executed. That is, unnecessary external update processing is not executed and the external update processing is executed efficiently. It is thus possible to efficiently update the map information when the in-vehicle device and the external device shares the map information.

BRIEF DESCRIPTION OF DRAWINGS

FIG. 13 is a conceptual diagram for explaining terrain map information in the embodiment of the present disclosure;

EMBODIMENTS

Embodiments of the present disclosure will be described below with reference to the attached drawings.

1. Outline

Figure 1:
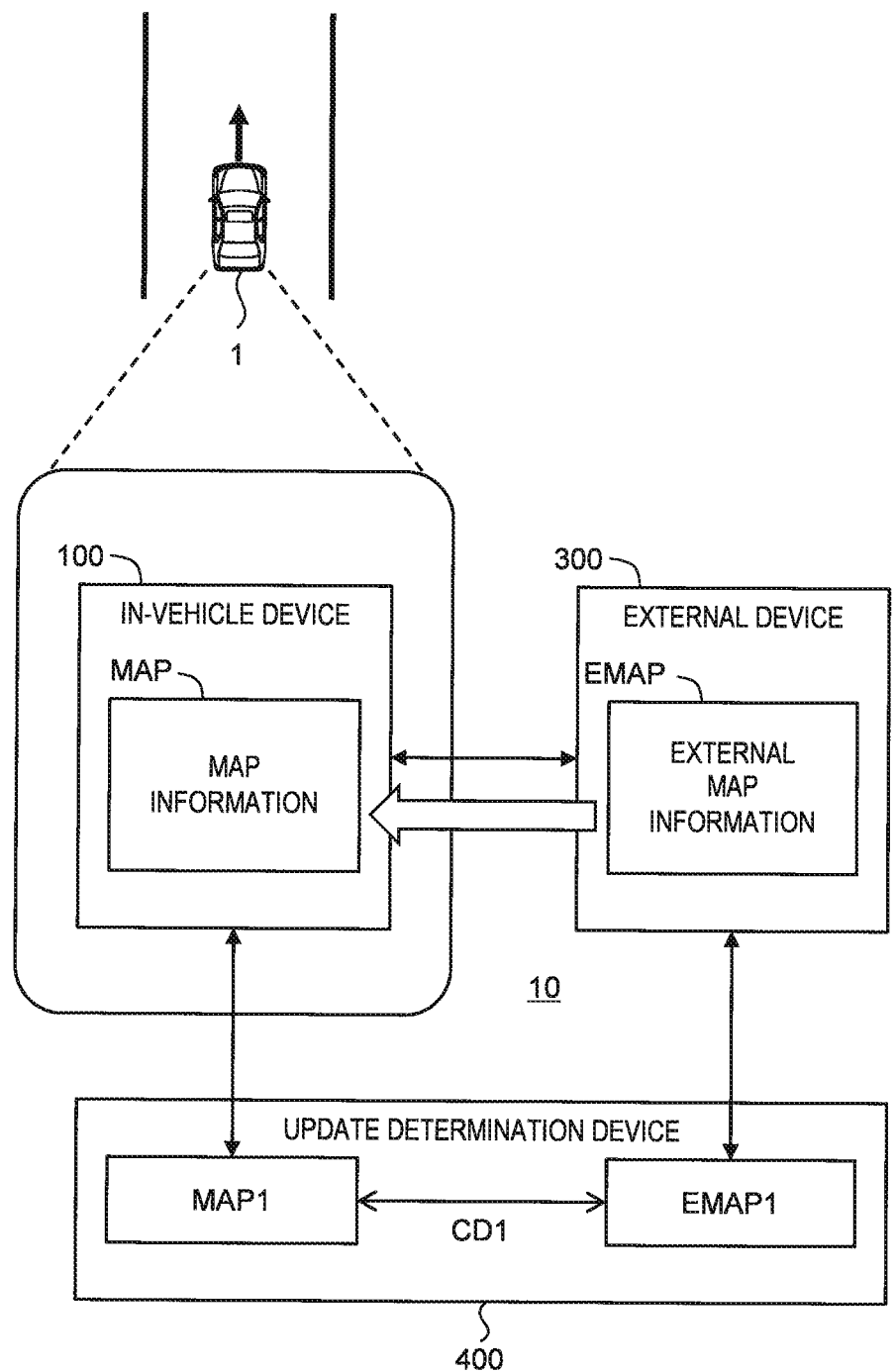
FIG. 1 is a block diagram schematically showing a map information system according to an embodiment of the present disclosure.

FIG. 1 is a block diagram schematically showing a map information system 10 according to the present embodiment. The map information system 10 includes an in-vehicle device 100, an external device 300, and an update determination device 400.

The in-vehicle device 100 is installed on a vehicle 1. The in-vehicle device 100 executes driving support control that supports driving of the vehicle 1. Typically, the driving support control includes at least one of steering control, acceleration control, and deceleration control. Such the driving support control is exemplified by automated driving control (autonomous driving control), trajectory-following control (path-following control), lane keep assist control (lane tracing assist control), collision avoidance control, and so forth.

In the driving support control, map information MAP is used. The map information MAP provides a variety of information associated with a position. Here, the position is an absolute position and is defined in an absolute coordinate system (e.g. latitude, longitude, and altitude). Increase in quality (evaluation value) of the map information MAP results in increase in accuracy of the driving support control executed based on the map information MAP.

The external device 300 is separated from the in-vehicle device 100 and typically exists outside the vehicle 1. The external device 300 has external map information EMAP. The external map information EMAP is the same kind of information as the map information MAP. However, date-and-time of update and quality of the external map information EMAP are not always the same as those of the map information MAP.

The in-vehicle device 100 updates the map information MAP by using the external map information EMAP on the side of the external device 300, as necessary. Such the update processing is hereinafter referred to as "external update processing". A target area for the external update processing is hereinafter referred to as a "first area". For example, the first area is a travel area in which the vehicle 1 is expected to travel. "First map information MAP1" is the map information MAP of the first area. On the other hand, "first external map information EMAP1" is the external map information EMAP of the first area.

It is inefficient to execute the external update processing over the first area without any condition. For example, when a content of the first map information MAP1 is almost the same as the first external map information EMAP1, the external update processing has no significant effect on the map information MAP and accuracy of the driving support control. Such the unnecessary external update processing is inefficient and undesirable.

In view of the above, the map information system 10 according to the present embodiment includes the update determination device 400. The update determination device 400 classifies the first area into a "first update-permitted section" and a "first update-prohibited section". The first update-permitted section is an area in which the external update processing is permitted. On the other hand, the first update-prohibited section is an area in which the external update processing is prohibited.

More specifically, the update determination device 400 is capable of accessing the in-vehicle device 100 and the external device 300, and acquires the first map information MAP1 and the first external map information EMAP1. The update determination device 400 further calculates a "first change degree CD1" being a difference between the first map information MAP1 and the first external map information EMAP1. The first change degree CD1 is calculated for each point or each area in the first area. Then, the update determination device 400 classifies the point or area where the first change degree CD1 is equal to or less than a first threshold TH1 as the first update-prohibited section. Whereas, the update determination device 400 classifies the point or area where the first change degree CD1 exceeds the first threshold TH1 as the first update-permitted section.

The update determination device 400 prohibits the external update processing with respect to the first update-prohibited section and permits the external update processing with respect to the first update-permitted section. The in-vehicle device 100 can execute the external update processing with respect to the first update-permitted section, but does not execute the external update processing with respect to the first update-prohibited section.

According to the present embodiment, as described above, the external update processing is not executed with respect to the first update-prohibited section in which the first change degree CD1 is small. In other words, the external update processing having no significant effect on the map information MAP is prevented from being executed. That is, unnecessary external update processing is not executed and the external update processing is executed efficiently. It is thus possible to efficiently update the map information MAP.

Quantitative and qualitative improvement of the map information MAP makes it possible to start highly accurate automated driving control. The in-vehicle device 100 may recognize a situation around the vehicle 1 by the use of an in-vehicle sensor to update the map information MAP based on a result of the recognition. Such the update processing is hereinafter referred to as "internal update processing". Executing both the internal update processing and the external update processing makes it possible to reduce a time required for improving the map information MAP. As a result, it is possible to shorten a time to start the highly accurate automated driving control.

Figure 2:
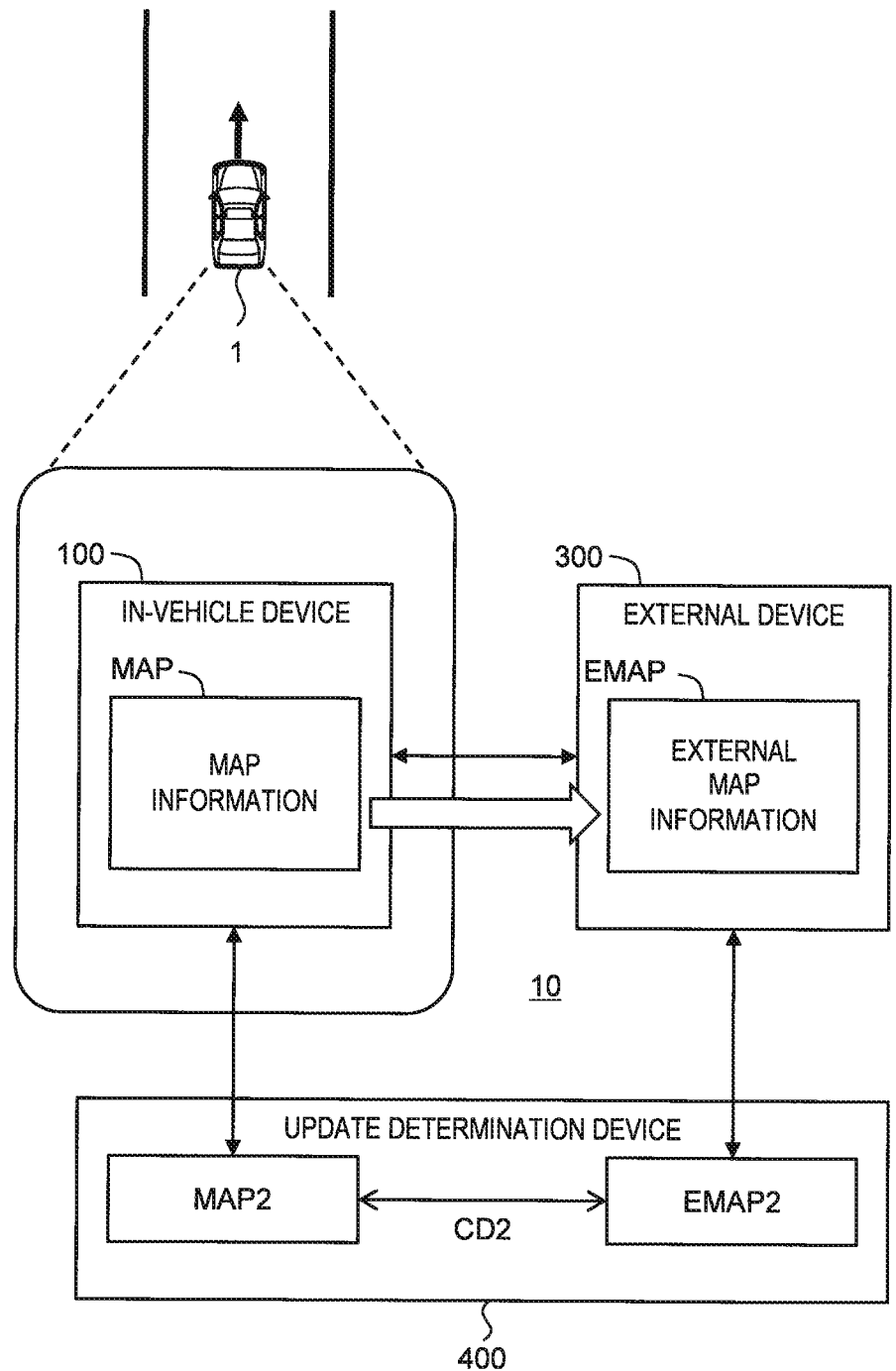
FIG. 2 is a block diagram schematically showing the map information system according to the embodiment of the present disclosure.

As another example, FIG. 2 shows a case where the external map information EMAP is updated by using the map information MAP. Processing of updating the external map information EMAP by using the map information MAP is hereinafter referred to as "map update processing". As a result of the internal update processing described above, the quality of the map information MAP on the side of the in-vehicle device 100 may become higher than that of the external map information EMAP on the side of the external device 300. Therefore, a request for the map update processing may occur.

A target area for the map update processing is hereinafter referred to as a "second area". For example, the second area is a travel area in which the vehicle 1 already traveled. "Second map information MAP2" is the map information MAP of the second area. On the other hand, "second external map information EMAP2" is the external map information EMAP of the second area.

The update determination device 400 classifies the second area into a "second update-permitted section" and a "second update-prohibited section". The second update-permitted section is an area in which the map update processing is permitted. On the other hand, the second update-prohibited section is an area in which the map update processing is prohibited.

More specifically, the update determination device 400 acquires the second map information MAP2 and the second external map information EMAP2. The update determination device 400 further calculates a "second change degree CD2" being a difference between the second map information MAP2 and the second external map information EMAP2. The second change degree CD2 is calculated for each point or each area in the second area. Then, the update determination device 400 classifies the point or area where the second change degree CD2 is equal to or less than a second threshold TH2 as the second update-prohibited section. Whereas, the update determination device 400 classifies the point or area where the second change degree CD2 exceeds the second threshold TH2 as the second update-permitted section.

The update determination device 400 prohibits the map update processing with respect to the second update-prohibited section and permits the map update processing with respect to the second update-permitted section. The external device 300 can execute the map update processing with respect to the second update-permitted section, but does not execute the map update processing with respect to the second update-prohibited section.

According to the present embodiment, as described above, the map update processing is not executed with respect to the second update-prohibited section in which the second change degree CD2 is small. In other words, the map update processing having no significant effect on the external map information EMAP is prevented from being executed. That is, unnecessary map update processing is not executed and the map update processing is executed efficiently. It is thus possible to efficiently update the external map information EMAP.

Hereinafter, the map information system 10 according to the present embodiment will be described in more detail.

2. Configuration Example of Map Information System 10

2-1. Configuration Example of In-Vehicle Device 100

Figure 3:
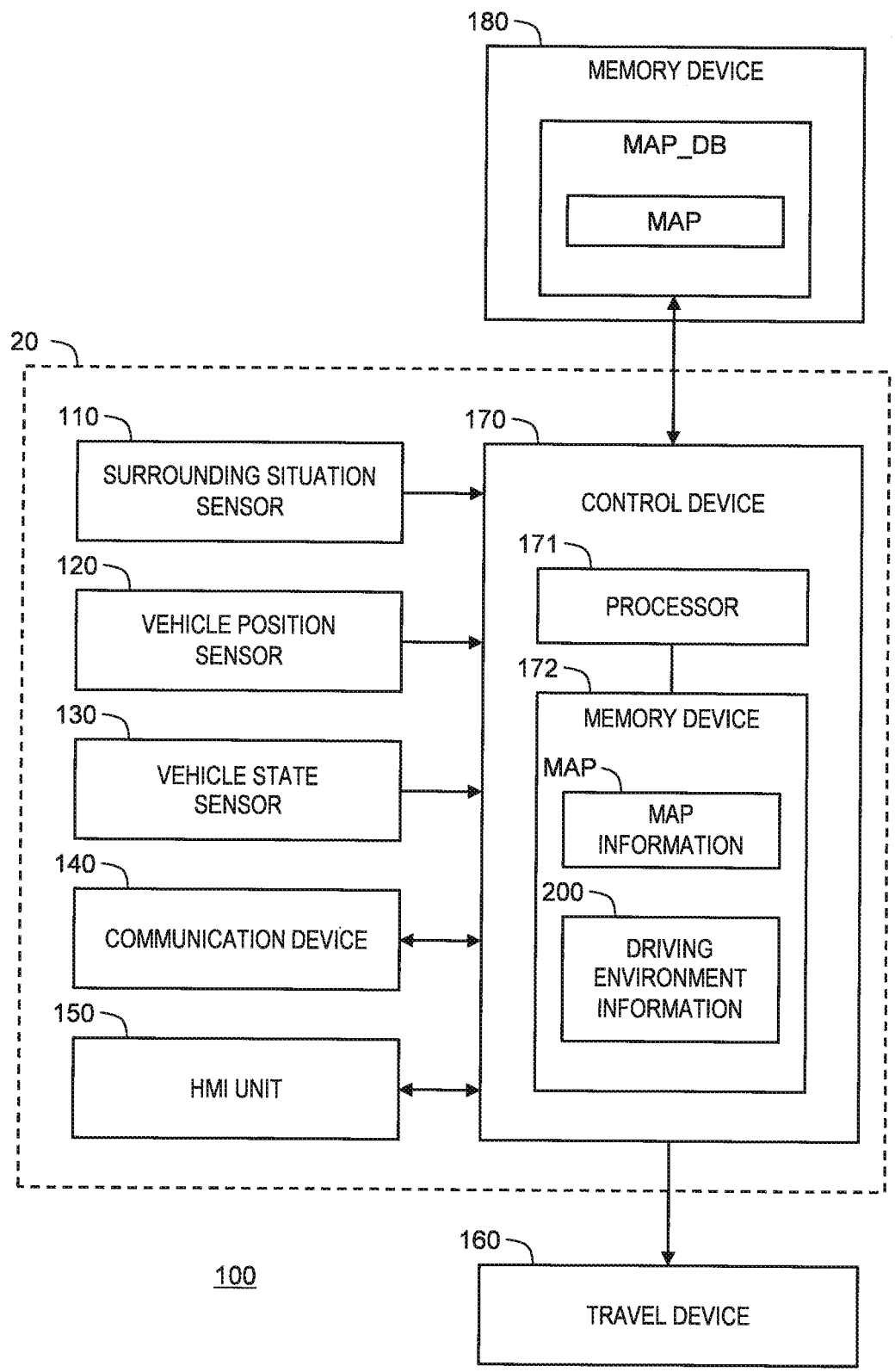
FIG. 3 is a block diagram showing a configuration example of an in-vehicle device according to the embodiment of the present disclosure.

FIG. 3 is a block diagram showing a configuration example of the in-vehicle device 100 according to the present embodiment. The in-vehicle device 100 is installed on the vehicle 1 and includes a surrounding situation sensor 110, a vehicle position sensor 120, a vehicle state sensor 130, a communication device 140, an HMI (Human Machine Interface) unit 150, a travel device 160, a control device (controller) 170, and a memory device 180.

The surrounding situation sensor 110 detects (recognizes) a situation around the vehicle 1. The surrounding situation sensor 110 is exemplified by a camera (imaging device), a LIDAR (Laser Imaging Detection and Ranging), a radar, and so forth. The camera images a situation around the vehicle 1. The LIDAR uses laser beams to detect a target around the vehicle 1. The radar uses radio waves to detect a target around the vehicle 1.

The vehicle position sensor 120 detects a position and an orientation (e.g. azimuth) of the vehicle 1. For example, the vehicle position sensor 120 includes a GPS (Global Positioning System) sensor. The GPS sensor receives signals transmitted from a plurality of GPS satellites and calculates the position and the orientation of the vehicle 1 based on the received signals.

The vehicle state sensor 130 detects a state of the vehicle 1. The state of the vehicle 1 includes a speed of the vehicle 1 (i.e. a vehicle speed), an acceleration, a steering angle, a yaw rate, and so forth. The state of the vehicle 1 further includes a driving operation by a driver of the vehicle 1. The driving operation includes an acceleration operation, a braking operation, and a steering operation.

The communication device 140 communicates with the outside of the vehicle 1. For example, the communication device 140 communicates with the external device 300 outside the vehicle 1 through a communication network. The communication device 140 may perform a V2I communication (vehicle-to-infrastructure communication) with a surrounding infrastructure. The communication device 140 performs a V2V communication (vehicle-to-vehicle communication) with a surrounding vehicle.

The HMI unit 150 is an interface for providing the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The travel device 160 includes a steering device, a driving device, and a braking device. The steering device turns wheels. The driving device is a power source that generates a driving force. The driving device is exemplified by an engine and an electric motor. The braking device generates a braking force.

A map database MAP_DB is stored in the memory device 180. The map database MAP_DB is a set of a variety of map information MAP. Examples of the variety of map information MAP will be described later (see Section 3).

The control device (controller) 170 is a microcomputer including a processor 171 and a memory device 172. The control device 170 is also called an ECU (Electronic Control Unit). A variety of processing by the control device 170 is achieved by the processor 171 executing a control program stored in the memory device 172.

For example, the control device 170 acquires driving environment information 200 indicating driving environment for the vehicle 1. The driving environment information 200 is stored in the memory device 172 and read out from the memory device 172 to be used, as appropriate.

Figure 4:
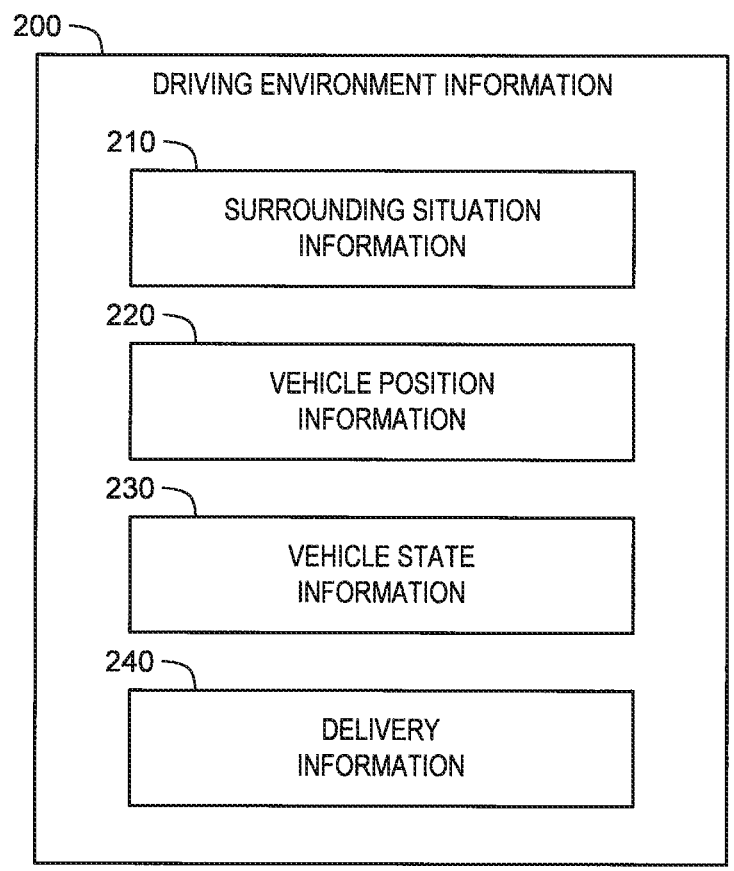
FIG. 4 is a block diagram showing an example of driving environment information used in the embodiment of the present disclosure.

FIG. 4 is a block diagram showing an example of the driving environment information 200. The driving environment information 200 includes surrounding situation information 210, vehicle position information 220, vehicle state information 230, and delivery information 240.

The surrounding situation information 210 indicates the situation around the vehicle 1. The surrounding situation information 210 is information obtained from a result of detection by the surrounding situation sensor 110. For example, the surrounding situation information 210 includes image information obtained by the camera. The surrounding situation information 210 may include measurement information obtained by the LIDAR and the radar. The surrounding situation information 210 may include target information regarding a target detected based on the image information and the measurement information. The target around the vehicle 1 is exemplified by a surrounding vehicle, a pedestrian, a white line, a roadside structure, a sign, and so forth. The target information includes a relative position, a relative velocity, and the like of the detected target. The control device 170 acquires the surrounding situation information 210 based on the result of detection by the surrounding situation sensor 110.

The vehicle position information 220 indicates the position and the orientation of the vehicle 1. The control device 170 acquires the vehicle position information 220 from the vehicle position sensor 120. Furthermore, the control device 170 may execute a well-known localizing processing by the use of the target information included in the surrounding situation information 210 to increase accuracy of the vehicle position information 220.

The vehicle state information 230 indicates the state of the vehicle 1. The state of the vehicle 1 includes the speed of the vehicle 1 (i.e. the vehicle speed), the acceleration, the steering angle, the yaw rate, and so forth. The state of the vehicle 1 further includes the driving operation by the driver of the vehicle 1. The driving operation includes the acceleration operation, the braking operation, and the steering operation. The control device 170 acquires the vehicle state information 230 from the vehicle state sensor 130.

The delivery information 240 is information acquired through the communication device 140. The control device 170 acquires the delivery information 240 by using the communication device 140 to communicate with the outside of the vehicle 1. For example, the delivery information 240 includes road traffic information (e.g. road work zone information, accident information, traffic restriction information, traffic jam information) delivered from an infrastructure. The delivery information 240 may include information on the surrounding vehicle acquired through the V2V communication.

In addition, the control device 170 acquires the map information MAP necessary for the driving support control from the map database MAP_DB. The map information MAP is stored in the memory device 172 and read out from the memory device 172 to be used, as appropriate.

The control device 170 executes the driving support control based on the map information MAP and the driving environment information 200. The driving support control is exemplified by the automated driving control, the trajectory-following control, the lane keep assist control, the collision avoidance control, and so forth. For the purpose of the driving support control, the control device 170 executes vehicle travel control as appropriate. The vehicle travel control includes steering control, acceleration control, and deceleration control. The control device 170 executes the steering control, the acceleration control, and the deceleration control by appropriately actuating the travel device 160 (i.e. the steering device, the driving device, and the braking device). It can be said that the control device 170 and the travel device 160 constitute a "vehicle travel control device" that executes the vehicle travel control.

As an example of the driving support control, let us consider a case where the control device 170 executes the automated driving control. The control device 170 generates a travel plan for the vehicle 1 based on the map information MAP and the driving environment information 200. The travel plan includes a target route to a destination and a local target trajectory (e.g. a target trajectory within a lane, a target trajectory for a lane change). Moreover, the travel plan includes a vehicle travel control plan for traveling so as to follow the target trajectory, following a traffic rule, avoiding an obstacle, and so forth. The control device 170 executes the vehicle travel control such that the vehicle 1 travels in accordance with the travel plan.

Moreover, the control device 170 executes the "internal update processing" that updates the map database MAP_DB (i.e. the map information MAP) stored in the memory device 180. The internal update processing is executed based on the driving environment information 200. Details of the internal update processing will be described later (see Section 4).

Furthermore, the control device 170 executes the "external update processing" that updates the first map information MAP1 by using the first external map information EMAP1 (see FIG. 1). Details of the external update processing will be described later (see Section 5).

2-2. Configuration Example of Information Acquisition Device 20

An information acquisition device 20 acquires the driving environment information 200. As shown in FIG. 3, the surrounding situation sensor 110, the vehicle position sensor 120, the vehicle state sensor 130, the communication device 140, and the control device 170 constitute the information acquisition device 20.

2-3. Configuration Example of External Device 300

2-3-1. First Configuration Example

Figure 5:
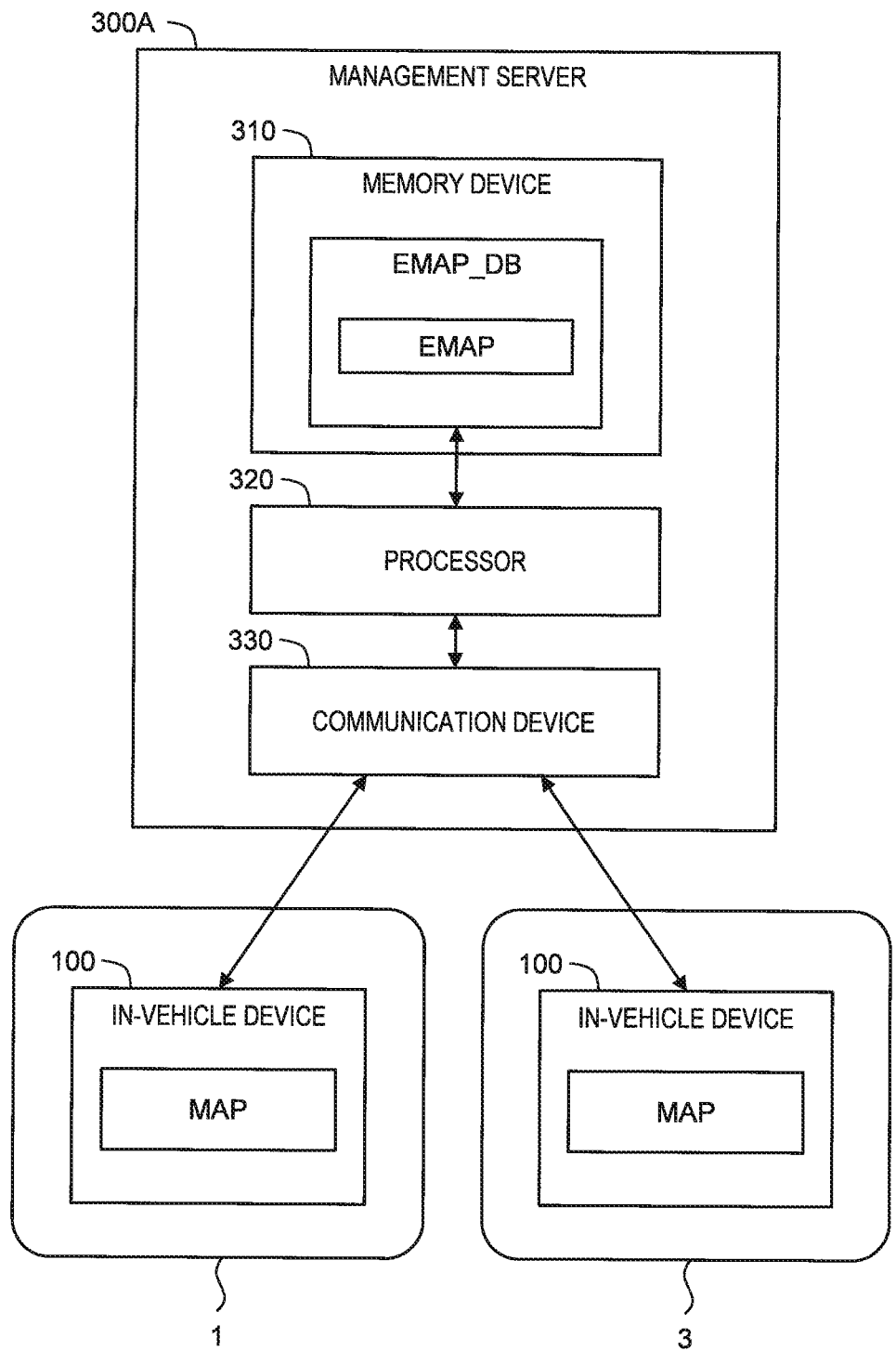
FIG. 5 is a block diagram showing a first configuration example of an external device according to the embodiment of the present disclosure.

FIG. 5 is a block diagram showing a first configuration example of the external device 300 according to the present embodiment. In the first configuration example, the external device 300 is a management server 300A that exists outside the vehicle 1. The management server 300A manages the external map information EMAP.

More specifically, the management server 300A includes a memory device 310, a processor 320, and a communication device 330. A map database EMAP_DB is stored in the memory device 310. The map database EMAP_DB is a set of a variety of external map information EMAP. The processor 320 manages the map database EMAP_DB (i.e. the external map information EMAP). Processing by the processor 320 is achieved by the processor 320 executing a computer program stored in the memory device. The communication device 330 communicates with the communication device 140 of the in-vehicle device 100. When the in-vehicle device 100 is installed also on another vehicle 3, the communication device 330 communicates with respective in-vehicle devices 100 of the vehicle 1 and the other vehicle 3.

The management of the map database EMAP_DB includes the above-described "map update processing" (see FIG. 2). In the map update processing, the processor 320 receives the second map information MAP2 from the in-vehicle device 100 of the vehicle 1 or the other vehicle 3 through the communication device 330. Then, the processor 320 updates the second external map information EMAP2 by using the second map information MAP2. Details of the map update processing will be described later (see Section 6).

The management of the map database EMAP_DB further includes providing the external map information EMAP. For example, the processor 320 receives a map provision request from the in-vehicle device 100 of the vehicle 1 or the other vehicle 3 through the communication device 330. The processor 320 reads the external map information EMAP requested by the map provision request from the memory device 310. Then, the processor 320 transmits the external map information EMAP to the request source through the communication device 330. The external map information EMAP transmitted to the request source is used for the above-described "external update processing" (see FIG. 1), and so forth.

2-3-2. Second Configuration Example

Figure 6:
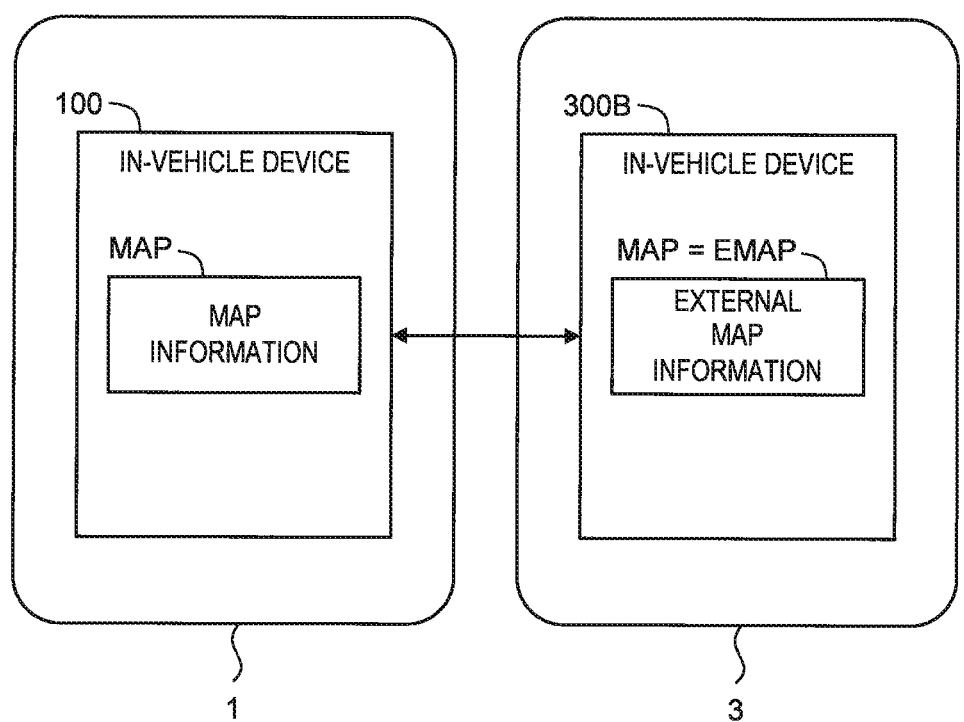
FIG. 6 is a block diagram showing a second configuration example of the external device according to the embodiment of the present disclosure.

FIG. 6 is a block diagram showing a second configuration example of the external device 300 according to the present embodiment. In the second configuration example, the external device 300 is an in-vehicle device 300B installed on another vehicle 3.

The in-vehicle device 300B has the same configuration and functions as the in-vehicle device 100 installed on the vehicle 1. The map information MAP is stored in a memory device of the in-vehicle device 300B. When seen from the vehicle 1, the map information MAP on the side of the other vehicle 3 corresponds to the external map information EMAP. The in-vehicle device 100 on the side of the vehicle 1 and the in-vehicle device 300B on the side of the other vehicle 3 perform the V2V communication (vehicle-to-vehicle communication). The V2V communication enables communication of the map information MAP or the external map information EMAP between the in-vehicle device 100 and the in-vehicle device 300B. As a result, the "external update processing" (see FIG. 1) and the "map update processing" (see FIG. 2) are possible.

2-3-3. Third Configuration Example

Figure 7:
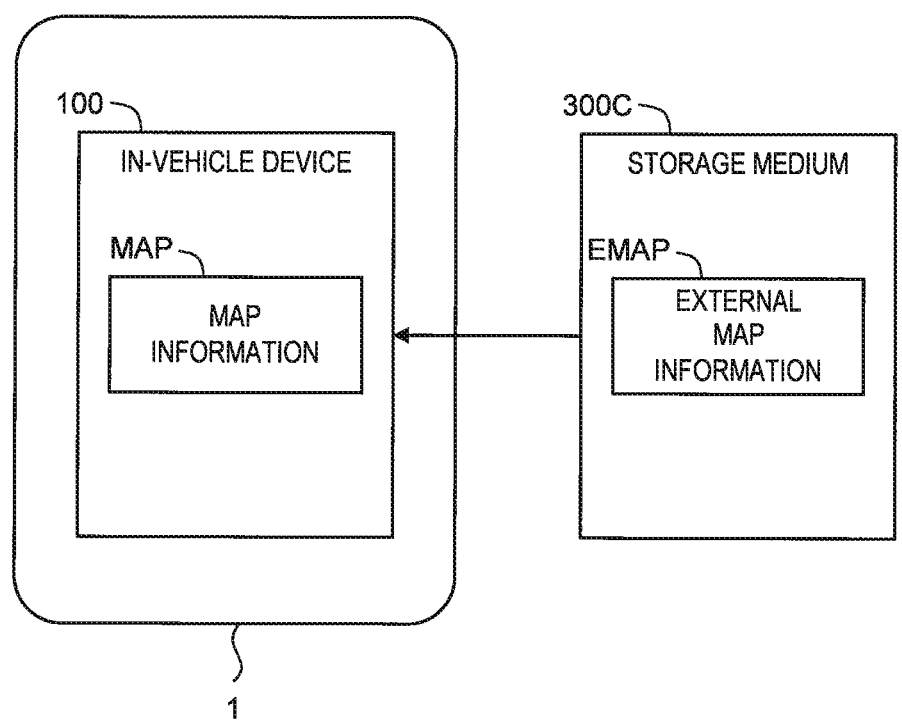
FIG. 7 is a block diagram showing a third configuration example of the external device according to the embodiment of the present disclosure.

FIG. 7 is a block diagram showing a third configuration example of the external device 300 according to the present embodiment. In the third configuration example, the external device 300 is a storage medium 300C. The storage medium 300C is exemplified by an HDD (Hard Disk Drive), an SSD (Solid State Drive), an optical disk, and so forth.

The external map information EMAP is stored in the storage medium 300C. The in-vehicle device 100 reads necessary external map information EMAP from the storage medium 300C by using a read device (not shown). As a result, the "external update processing" (see FIG. 1) is possible.

2-4. Configuration Example of Update Determination Device 400

The update determination device 400 is capable of accessing the in-vehicle device 100 and the external device 300. Various examples can be considered as a configuration of the update determination device 400.

2-4-1. First Configuration Example

Figure 8:
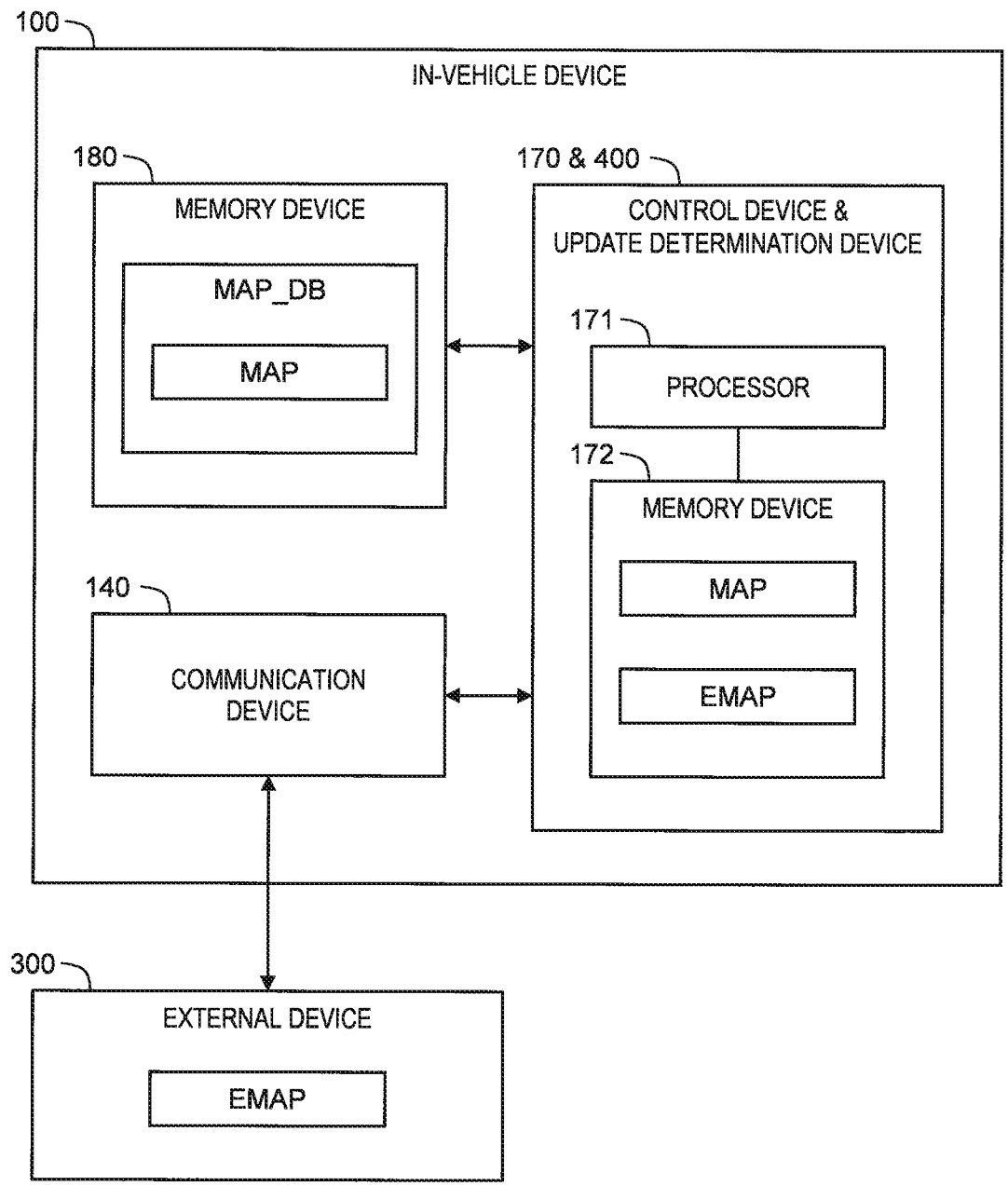
FIG. 8 is a block diagram showing a first configuration example of an update determination device according to the embodiment of the present disclosure.

FIG. 8 is a block diagram showing a first configuration example of the update determination device 400 according to the present embodiment. In the first configuration example, the control device 170 of the in-vehicle device 100 serves as the update determination device 400.

More specifically, the control device 170 acquires necessary map information MAP (i.e. the first map information MAP1 or the second map information MAP2) from the memory device 180. Moreover, the control device 170 acquires necessary external map information EMAP (i.e. the first external map information EMAP1 or the second external map information EMAP2) from the external device 300 through the communication device 140. In the case where the external device 300 is the storage medium 300C shown in FIG. 7, the control device 170 uses the read device (not shown) to read necessary external map information EMAP from the storage medium 300C. Then, the control device 170 executes update determination processing based on the map information MAP and the external map information EMAP.

2-4-2. Second Configuration Example

Figure 9:
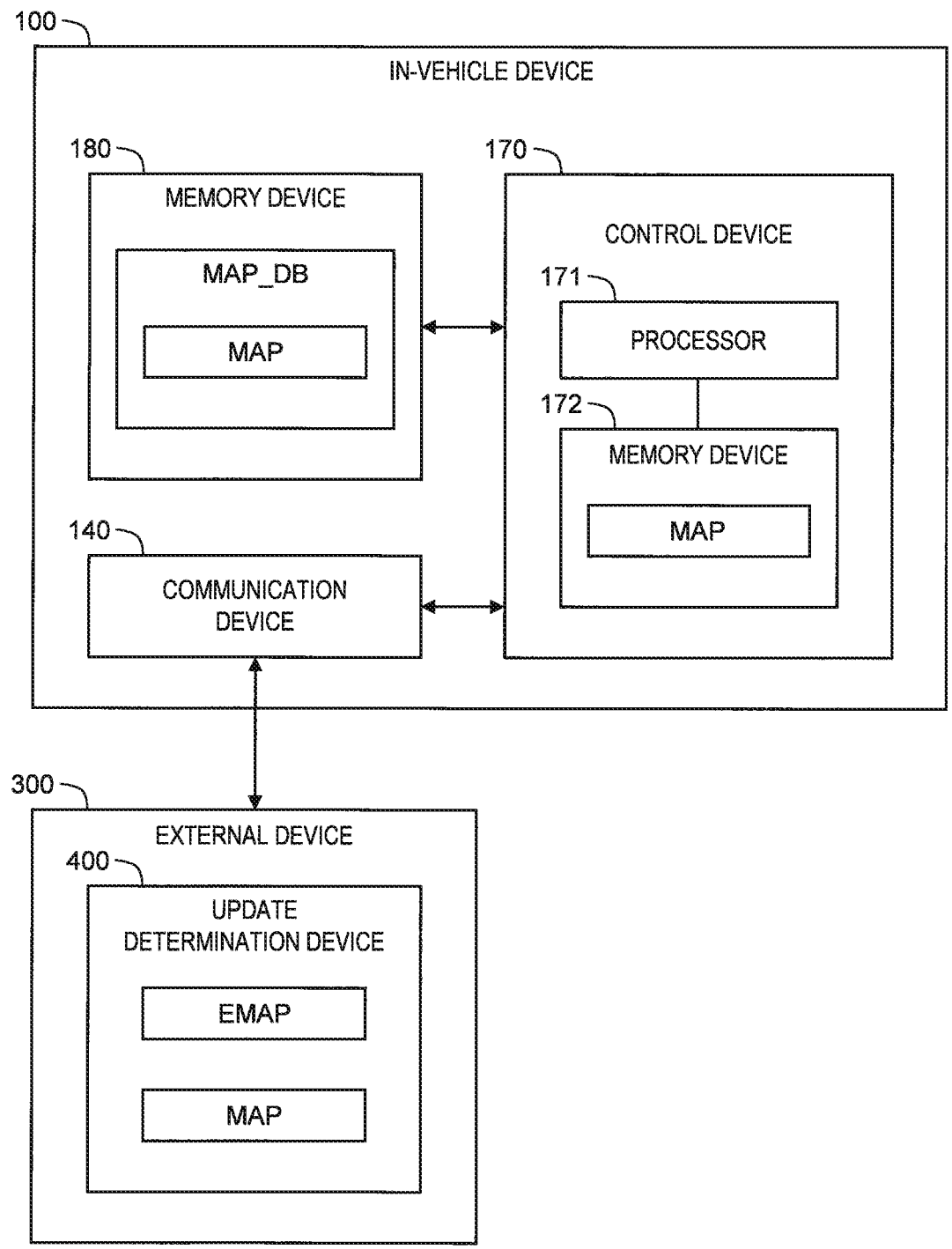
FIG. 9 is a block diagram showing a second configuration example of the update determination device according to the embodiment of the present disclosure.

FIG. 9 is a block diagram showing a second configuration example of the update determination device 400 according to the present embodiment. In the second configuration example, the external device 300 serves as the update determination device 400.

In the case where the external device 300 is the management server 300A shown in FIG. 5, the management server 300A (i.e. the processor 320) acquires necessary external map information EMAP (i.e. the first external map information EMAP1 or the second external map information EMAP2) from the memory device 310. Moreover, the management server 300A acquires necessary map information MAP (i.e. the first map information MAP1 or the second map information MAP2) from the in-vehicle device 100 through the communication device 330. Then, the management server 300A executes update determination processing based on the map information MAP and the external map information EMAP.

In the case where the external device 300 is the in-vehicle device 300B shown in FIG. 6, the in-vehicle device 300B acquires necessary external map information EMAP (i.e. the first external map information EMAP1 or the second external map information EMAP2) from the memory device. Moreover, the in-vehicle device 300B acquires necessary map information MAP (i.e. the first map information MAP1 or the second map information MAP2) from the in-vehicle device 100 through the V2V communication. Then, the in-vehicle device 300B executes update determination processing based on the map information MAP and the external map information EMAP.

3. Examples of Map Information Map

Figure 10:
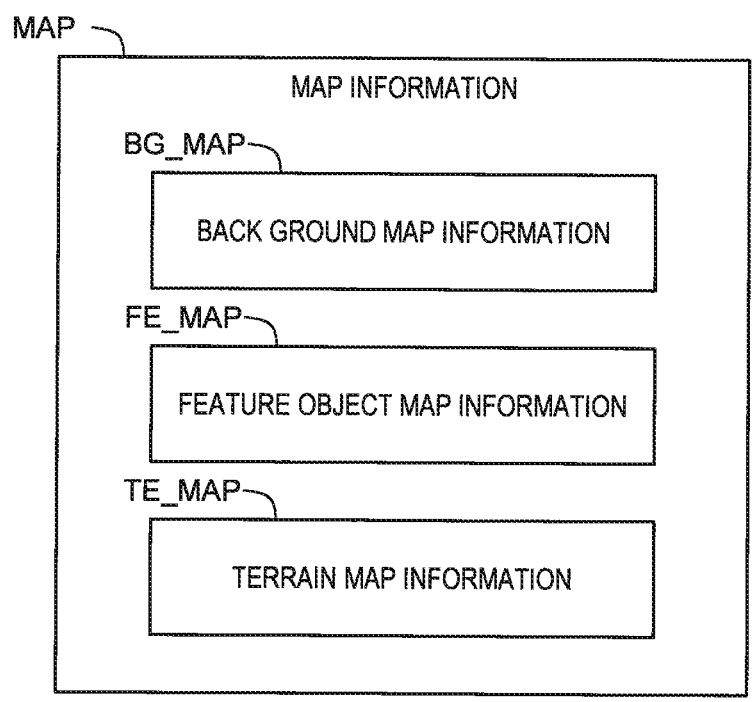
FIG. 10 is a block diagram showing various examples of map information in the embodiment of the present disclosure.

Next, examples of the map information MAP according to the present embodiment will be described. Note that the same applies to the external map information EMAP. The map information MAP includes not only a road map and a navigation map commonly used but also map information in various aspects. In an example shown in FIG. 10, the map information MAP includes back ground map information BG_MAP, feature object map information FE_MAP, and terrain map information TE_MAP. Each map information provides information associated with position (absolute position). Hereinafter, each map information will be described in detail.

3-1. Back Ground Map Information BG_MAP

Figure 11:
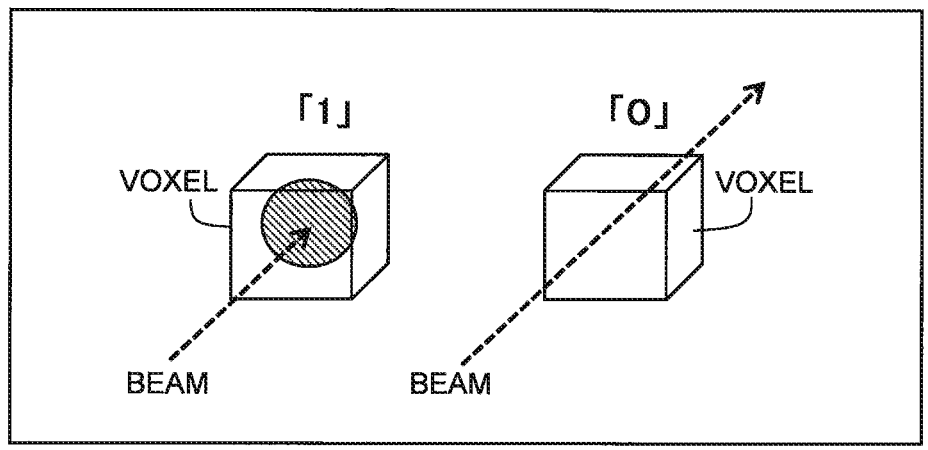
FIG. 11 is a conceptual diagram for explaining back ground map information in the embodiment of the present disclosure.

FIG. 11 is a conceptual diagram for explaining the back ground map information BG_MAP. The back ground map information BG_MAP, which is map information regarding a stationary object, indicates for each position (absolute position) whether or not a stationary object exists. The stationary object includes a steady road-related structure such as a wall, a guardrail, and the like.

For example, the LIDAR included in the surrounding situation sensor 110 is used for detecting the stationary object. The LIDAR outputs laser beams to a plurality of directions in sequence (i.e. scanning). It is possible to calculate distances and directions of reflection points based on a reflection state of the laser beams. A LIDAR point cloud is a group of measurement points (i.e. the reflection points) measured by the LIDAR.

Space surrounding the vehicle 1 is divided into a large number of voxels V. When at least one laser beam is reflected at a certain voxel $V_i$, a measurement result value $M_i$ regarding the voxel $V_i$ is set to "1". When all laser beams entering into a certain voxel $V_i$ pass through without being reflected, the measurement result value $M_i$ regarding the voxel $V_i$ is set to "0". The measurement result value $M_i$ being "1" means that some kind of object exists in the voxel $V_i$. On the other hand, the measurement result value $M_i$ being "0" means that no object exists in the voxel $V_i$.

The LIDAR performs the laser beam scanning repeatedly in terms of time. Accordingly, a plurality of measurement result values $M_i$ that are successive in terms of time are obtained with regard to the same voxel $V_i$. An "occupancy $R_i$" regarding the voxel $V_i$ is defined by an average value of the plurality of measurement result values $M_i$. When the number of measurements is N, the occupancy $R_i$ regarding the voxel $V_i$ is expressed by the following Equation (1).

[Equation 1]

$$R_i = \frac{1}{N} \sum^{N} M_i \quad (1)$$

Moreover, every time the vehicle 1 passes a same road, the measurement result value $M_i$ regarding the voxel $V_i$ is newly obtained and the occupancy $R_i$ is calculated again. That is, the occupancy $R_i$ is updated.

The occupancy $R_i$ being "1" means that an object always exists in the voxel $V_i$. The object always existing is highly likely to be an stationary object. That is to say, the occupancy $R_i$ being "1" means that there is a strong probability that a stationary object exists in the voxel $V_i$. While on the other hand, the occupancy $R_i$ being "0" means that there is a strong probability that no stationary object exists in the voxel $V_i$. The occupancy $R_i$ being around 0.5 means that it is not certain (clear) whether or not any object exists in the voxel $V_i$.

Information that "there is a strong probability that a stationary object exists" is useful. For example, such the information is used for removing the stationary object from the LIDAR point cloud to detect a moving object such as a pedestrian. Information that "there is a strong probability that no stationary object exists" also is useful. The reason is that when an object is detected in free space where no stationary object exists, the detected object can be regarded as a moving object. In this manner, the back ground map information BG_MAP can be utilized for detecting a moving object.

An example of a data structure of the back ground map information BG_MAP also is shown in FIG. 11. One data set is created for each voxel $V_i$. In the example shown in FIG. 11, the data set includes a position (absolute position) [X, Y, Z] of the voxel $V_i$, the occupancy $R_i$, evaluation information, an evaluation value, and a time stamp.

The evaluation value indicates "certainty" of the back ground map information BG_MAP. For example, the evaluation value indicates certainty that a stationary object exists at the position [X, Y, Z] indicated by the back ground map information BG_MAP. The certainty can be reworded as accuracy or reliability. The evaluation value can be reworded as a score.

The evaluation information is information used for calculating the evaluation value. The evaluation information includes the number of measurements N. When the number of measurements N is small, the evaluation value is low. As the number of measurements N becomes larger, the evaluation value becomes higher. The evaluation information may include variance of positions of the measurement points (i.e. the reflection points) included in the voxel $V_i$. As the variance becomes larger, the evaluation value becomes lower.

The control device 170 generates and updates the back ground map information BG_MAP based on the driving environment information 200. More specifically, the driving environment information 200 includes the surrounding situation information 210 (specifically, LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each voxel $V_i$ based on the surrounding situation information 210 in the absolute coordinate system. The time stamp indicates a time when the data set is generated or a time when the data set is last updated.

3-2. Feature Object Map Information FE_MAP

Figure 12:
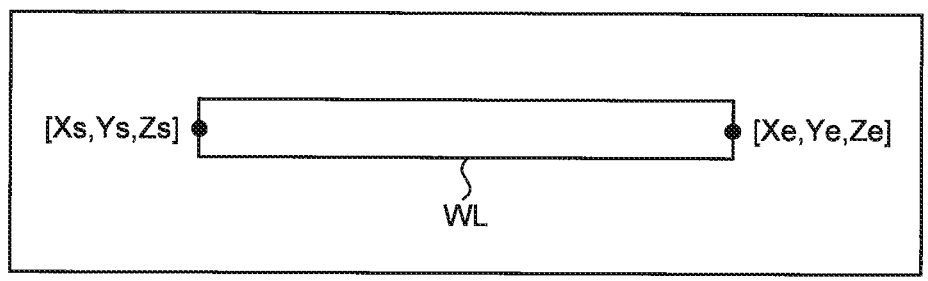
FIG. 12 is a conceptual diagram for explaining feature object map information in the embodiment of the present disclosure.

FIG. 12 is a conceptual diagram for explaining the feature object map information FE_MAP. The feature object map information FE_MAP, which is map information regarding a feature object, indicates a position (absolute position) of a feature object. The feature object is exemplified by a white line, a sign board (planar object), a pole (cylindrical object), and the like. Such the feature object map information FE_MAP is utilized, for example, for the localizing processing that increases the accuracy of the vehicle position information 220.

As an example, let us consider the feature object map information FE_MAP regarding a white line WL. The same applies to other feature objects.

A position of the white line WL is expressed by positions [Xs, Ys, Zs] and [Xe, Ye, Ze] of both ends of the white line WL. For example, at least one of the camera and the LIDAR included in the surrounding situation sensor 110 is used for calculating the position of the white line WL. More specifically, a road surface image representing a road surface is generated from camera image information or LIDAR measurement information. Subsequently, binarization processing or edge detection processing is executed to extract the white line WL from the road surface image. Then, the position of the white line WL is calculated based on the camera image information or the LIDAR measurement information.

Every time the vehicle 1 passes the same road, the same white line WL is repeatedly measured (detected) and the position of the same white line WL is repeatedly calculated. An average value or a weighted average value of the positions calculated so far is used as the position of the white line WL. That is to say, the position of the white line WL is updated every time the same white line WL is measured. In the case of the weighted average value, a weight for the latest position is set to be the largest. It should be noted that whether or not the white line WL measured this time is identical to an already-known white line WL is determined based on whether or not the white line WL measured this time is within a predetermined area around the already-known white line WL.

An example of a data structure of the feature object map information FE_MAP also is shown in FIG. 12. One data set is created for each white line WL. In the example shown in FIG. 12, the data set includes the position of the white line WL, evaluation information, an evaluation value, and a time stamp.

The evaluation value indicates "certainty" of the feature object map information FE_MAP. That is, the evaluation value indicates certainty that a feature object exists at the position indicated by the feature object map information FE_MAP.

The evaluation information is information used for calculating the evaluation value. The evaluation information includes the number of measurements, variance of the calculated positions, and so forth. For example, when the number of measurements is small, the evaluation value is low. As the number of measurements becomes larger, the evaluation value becomes higher. As the variance of the calculated positions becomes larger, the evaluation value becomes lower.

The control device 170 generates and updates the feature object map information FE_MAP based on the driving environment information 200. More specifically, the driving environment information 200 includes the surrounding situation information 210 (specifically, the camera image information and the LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each white line WL (i.e. the feature object) based on the surrounding situation information 210 in the absolute coordinate system. The time stamp indicates a time when the data set is generated or a time when the data set is last updated.

3-3. Terrain Map Information TE_MAP

FIG. 13 is a conceptual diagram for explaining the terrain map information TE_MAP. The terrain map information TE_MAP, which is map information regarding terrain, indicates a height (altitude) Z of a road surface at a position (absolute position) [X, Y].

For example, the LIDAR included in the surrounding situation sensor 110 is used for calculating the height Z of the road surface at the position [X, Y]. More specifically, a road surface point cloud representing the road surface is extracted from the LIDAR point cloud. Further, the road surface point cloud included in a certain area in the vicinity of the position [X, Y] is extracted. Then, the height Z of the road surface at the position [X, Y] is calculated by interpolating heights $ZL_3$ of the extracted road surface points in the vicinity of the position [X, Y]. For example, an average value of the heights $ZL_3$ of the extracted road surface points is calculated as the height Z. It should be noted that the number of the road surface points used for calculating the height Z and variance of the heights $ZL_3$ may be used as evaluation information described later.

Every time the vehicle 1 passes the same road, the same road surface is repeatedly measured (detected) and the height Z of the same road surface is repeatedly calculated. An average value or a weighted average value of the heights Z calculated so far is used as the height Z. That is to say, the height Z of the road surface is updated every time the same road surface is measured. In the case of the weighted average value, a weight for the latest height Z is set to be the largest.

An example of a data structure of the terrain map information TE_MAP also is shown in FIG. 13. One data set is created for each position [X, Y]. In the example shown in FIG. 13, the data set includes the position [X, Y], the height Z, evaluation information, an evaluation value, and a time stamp.

The evaluation value indicates "certainty" of the terrain map information TE_MAP. That is, the evaluation value indicates certainty that a road surface exists at the position [X, Y] and the height Z indicated by the terrain map information FE_MAP.

The evaluation information is information used for calculating the evaluation value. The evaluation information includes the number of measurements, variance, and so forth. The number of measurements includes at least one of the number of calculations of the height Z and the number of the road surface points used for calculating the height Z. The variance includes at least one of variance of the calculated heights Z and variance of the heights $ZL_3$ of the road surface points used for calculating the height Z. For example, when the number of measurements is small, the evaluation value is low. As the number of measurements becomes larger, the evaluation value becomes higher. As the variance becomes larger, the evaluation value becomes lower. As another example, the evaluation value may become lower as a difference between the height Z and a height Z' of an adjacent position becomes larger.

The control device 170 generates and updates the terrain map information TE_MAP based on the driving environment information 200. More specifically, the driving environment information 200 includes the surrounding situation information 210 (specifically, the LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each position [X, Y] based on the surrounding situation information 210 in the absolute coordinate system. The time stamp indicates a time when the data set is generated or a time when the data set is last updated.

Application of the terrain map information TE_MAP is as follows. For example, it is possible to remove the road surface from the LIDAR point cloud and thus to detect an obstacle (e.g. a fallen object) on the road surface. As another example, it is possible to calculate a road surface slope from the information of the height Z and thus to plan the vehicle travel control such as acceleration and deceleration based on the road surface slope. As still another example, it is possible to identify a travel area in which the vehicle 1 can travel.

3-4. Others

The map information MAP may further include the above-described LIDAR measurement information, camera image information, road surface image information, and so forth. When acquiring such the information, the control device 170 registers the acquired information in the map information MAP.

4. Internal Update Processing by in-Vehicle Device

Figure 14:
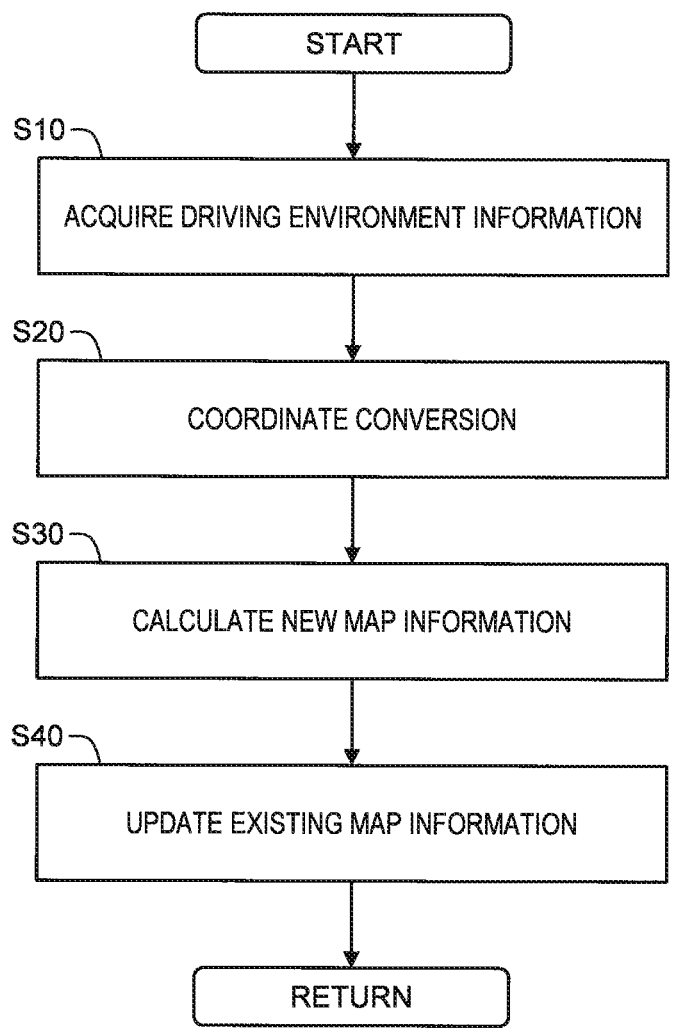
FIG. 14 is a flow chart showing internal update processing by the in-vehicle device according to the embodiment of the present disclosure.

FIG. 14 is a flow chart showing the internal update processing by the in-vehicle device 100 according to the present embodiment. The process flow shown in FIG. 14 is repeatedly executed every certain cycle.

In Step S10, the information acquisition device 20 (see FIG. 3) acquires the driving environment information 200. The driving environment information 200 is stored in the memory device 172 of the control device 170.

In Step S20, the control device 170 converts the surrounding situation information 210 to that in the absolute coordinate system based on the position and the orientation of the vehicle 1 indicated by the vehicle position information 220.

In Step S30, the control device 170 calculates new map information MAP based on the surrounding situation information 210 in the absolute coordinate system. The calculation of the map information MAP is as described in the above Section 3.

In Step S40, the control device 170 updates the existing map information MAP by using the new map information MAP calculated in Step S30. At this time, not only the main parameter (i.e. the occupancy $R_i$ regarding the voxel $V_i$, the position of the feature object, the height Z of the road surface) of the map information MAP but also the evaluation information, the evaluation value, and the time stamp are updated.

5. Processing Related to External Update Processing by In-Vehicle Device

Figure 15:
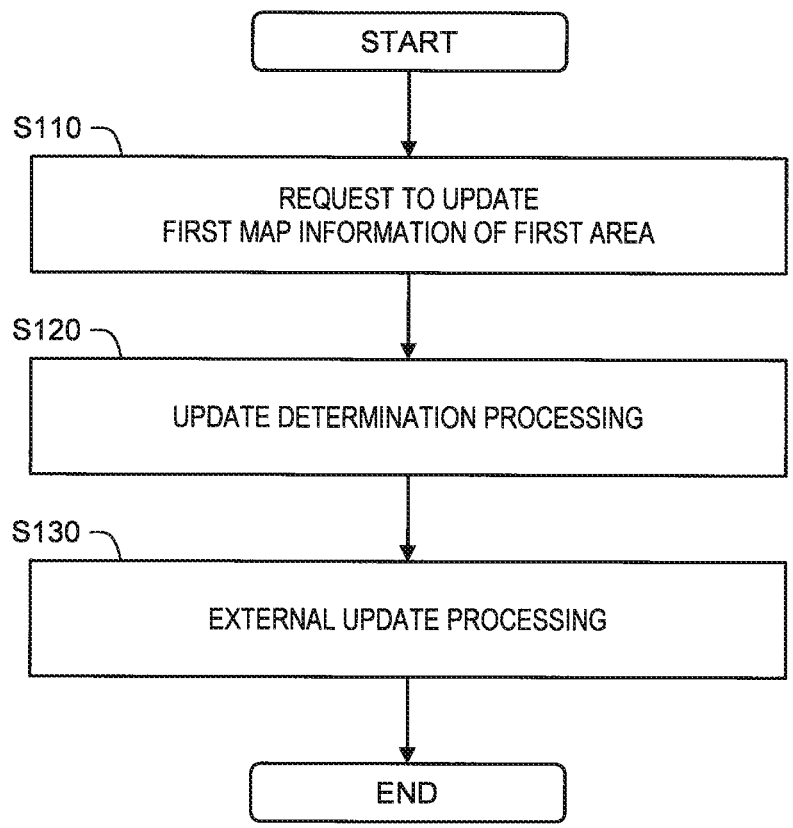
FIG. 15 is a flow chart showing processing related to external update processing by the in-vehicle device according to the embodiment of the present disclosure.

FIG. 15 is a flow chart showing processing related to the external update processing by the in-vehicle device 100 according to the present embodiment.

5-1. Step S110

The control device 170 of the in-vehicle device 100 or the external device 300 requests to update the first map information MAP1 of the first area. When the control device 170 requests the update, the control device 170 determines the first area and then sends an update request including information of the first area to the external device 300 and the update determination device 400. When the external device 300 requests the update, the external device 300 determines the first area and then sends an update request including information of the first area to the in-vehicle device 100 and the update determination device 400.

As an example, let us consider a case where the control device 170 executes the automated driving control. The driver uses the HMI unit 150 to set a destination. The control device 170 determines a target route to the destination based on the navigation map. Further, the control device 170 sets the target route and its surroundings as the first area. Before the vehicle 1 starts to travel, the control device 170 sends the update request including information of the first area to the external device 300 and the update determination device 400.

5-2. Step S120

Figure 16:
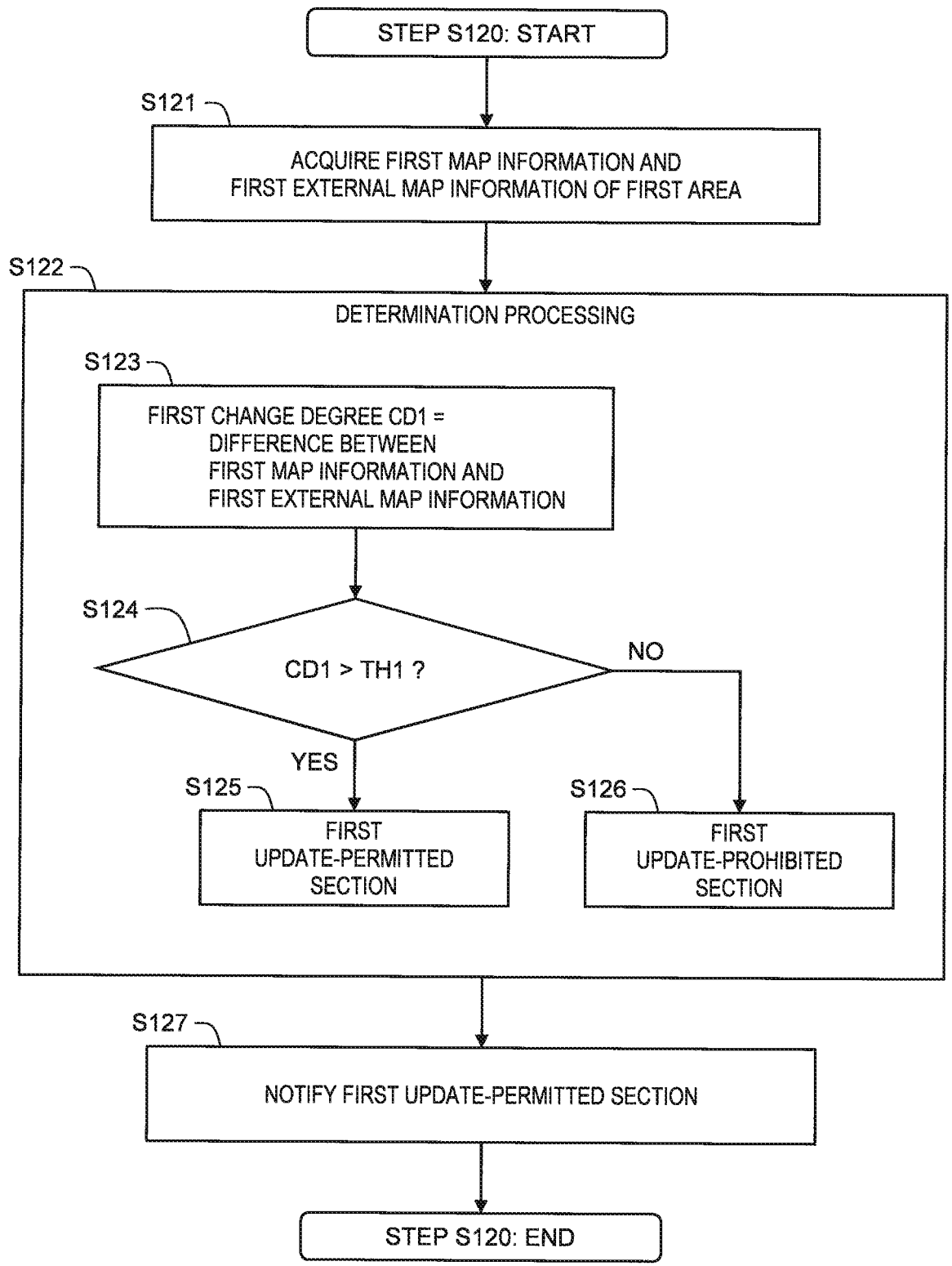
FIG. 16 is a flow chart showing update determination processing (Step S120) according to the embodiment of the present disclosure.

The update determination device 400 executes the update determination processing in response to the update request. FIG. 16 is flow chart showing the update determination processing (Step S120).

In Step S121, the update determination device 400 acquires the first map information MAP1 and the first external map information EMAP1 of the first area. Refer to the above-described Section 2-4 for the method of acquiring the first map information MAP1 and the first external map information EMAP1.

In Step S122, the update determination device 400 executes the following determination processing for each point or each area in the first area.

In Step S123, the update determination device 400 calculates the first change degree CD1 being a difference between the first map information MAP1 and the first external map information EMAP1. The first change degree CD1 regarding each point in the first area is as follows.

In the case of the back ground map information BG_MAP shown in FIG. 11, the first change degree CD1 is an absolute value of a difference in the occupancy $R_i$ between the first map information MAP1 and the first external map information EMAP1.

In the case of the feature object map information FE_MAP shown in FIG. 12, the first change degree CD1 is expressed by the following Equation (2). Here, positions [Xs1, Ys1, Zs1] and [Xe1, Ye1, Ze1] are the position indicated by the first map information MAP1. Positions [Xs2, Ys2, Zs2] and [Xe2, Ye2, Ze2] are the position indicated by the first external map information EMAP1.

[Equation 2]

$$CD1 = (Xs2 - Xs1)^2 + (Ys2 - Ys1)^2 + (Zs2 - Zs1)^2 + (Xe2 - Xe1)^2 + (Ye2 - Ye1)^2 + (Ze2 - Ze1)^2 \quad (2)$$

In the case of the terrain map information TE_MAP shown in FIG. 13, the first change degree CD1 is an absolute value of a difference in the height Z between the first map information MAP1 and the first external map information EMAP1.

In the case of the first change degree CD1 for each area, first change degrees CD1 regarding respective points included in an area are first calculated. Then, a sum or an average value of the calculated first change degrees CD1 is calculated as the first change degree CD1 regarding said area.

In Step S124, the update determination device 400 compares the first change degree CD1 with the first threshold TH1. When the first change degree CD1 exceeds the first threshold TH1 (Step S124; Yes), the processing proceeds to Step S125. On the other hand, when the first change degree CD1 is equal to or less than the first threshold TH1 (Step S124; No), the processing proceeds to Step S126.

In Step S125, the update determination device 400 classifies the point or the area as the first update-permitted section.

In Step S126, the update determination device 400 classifies the point or the area as the first update-prohibited section.

It should be noted that in the above-mentioned Step S123, the first map information MAP1 or the first external map information EMAP1 may not yet exist. When the first map information MAP1 does not yet exist, the processing proceeds to Step S125 in order to newly register the first map information MAP1. On the other hand, when the first external map information EMAP1 does not yet exist, the processing proceeds to Step S126, because there is no need to update the first map information MAP1.

When the determination processing (Step S122) is completed over the entire first area, the processing proceeds to Step S127. In Step S127, the update determination device 400 notifies the control device 170 and the external device 300 of the first update-permitted section.

5-3. Step S130

The control device 170 of the in-vehicle device 100 executes the external update processing in response to the update request. Various examples can be considered as a method of the external update processing.

5-3-1. First Example

Figure 17:
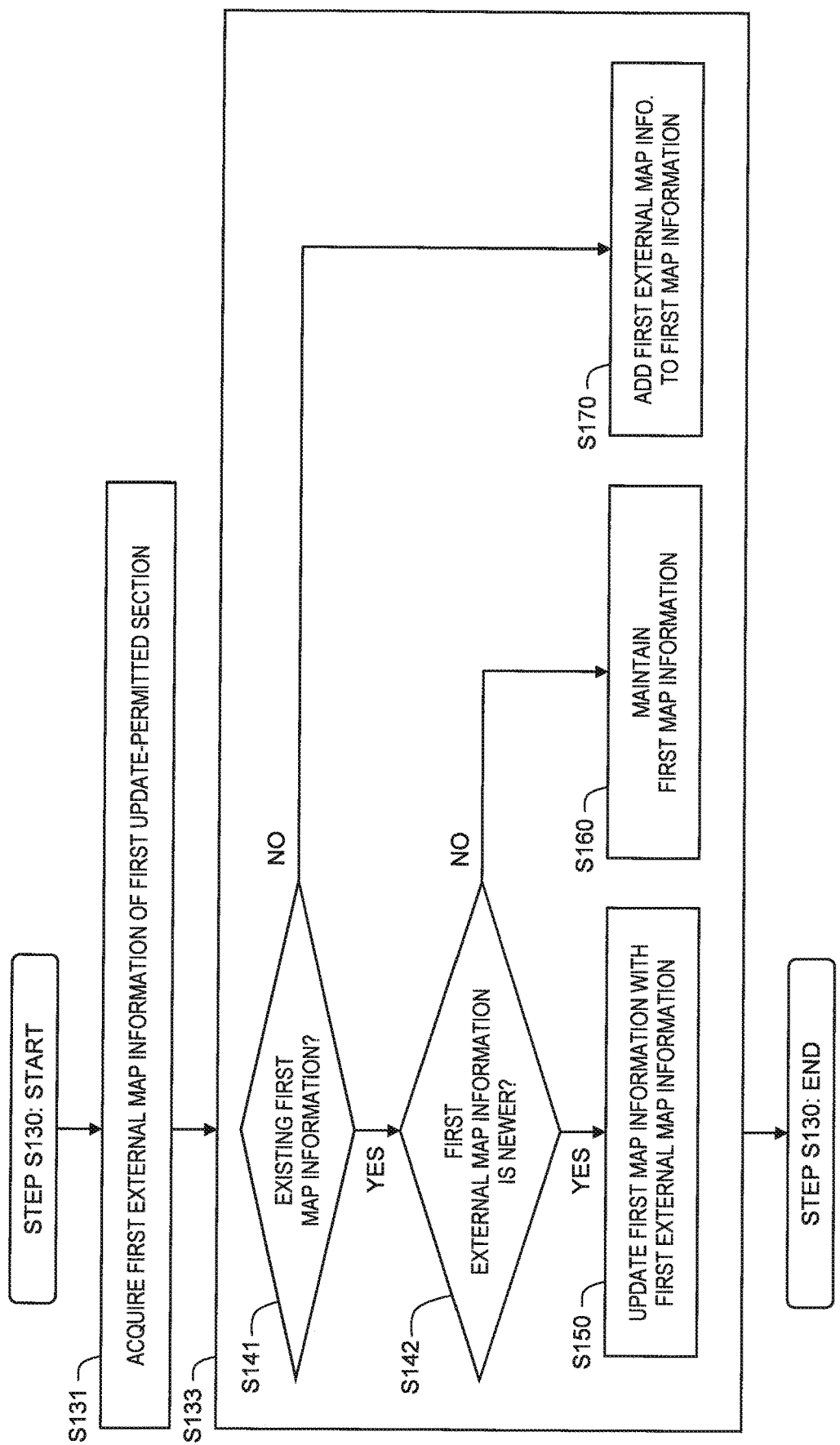
FIG. 17 is a flow chart showing a first example of the external update processing (Step S130) according to the embodiment of the present disclosure.

FIG. 17 is a flow chart showing a first example of the external update processing (Step S130).

In Step S131, the control device 170 acquires the first external map information EMAP1 of the first update-permitted section. In the case where the control device 170 serves as the update determination device 400 (see FIG. 8), the control device 170 extracts the first external map information EMAP1 of the first update-permitted section from the first external map information EMAP1 that is already acquired in the above-described Step S121. In the case where the external device 300 serves as the update determination device 400 (see FIG. 9), the control device 170 acquires the first external map information EMAP1 of the first update-permitted section from the external device 300 through the communication device 140.

In Step S133, the control device 170 executes the following determination processing for each point or each area in the first update-permitted section.

In Step S141, the control device 170 determines whether or not the first map information MAP1 already exists in the memory device 180. When the first map information MAP1 already exists (Step S141; Yes), the processing proceeds to Step S142. On the other hand, when the first map information MAP1 does not yet exist (Step S141; No), the processing proceeds to Step S170.

In Step S142, the control device 170 compares the time stamp of the first map information MAP1 and the time stamp of the first external map information EMAP1. When the time stamp of the first external map information EMAP1 is newer than the time stamp of the first map information MAP1 (Step S142; Yes), the processing proceeds to Step S150. Otherwise (Step S142; No), the processing proceeds to Step S160.

In Step S150, the control device 170 updates (replaces) the first map information MAP1 with the first external map information EMAP1.

In Step S160, the control device 170 maintains the existing first map information MAP1 without updating it.

In Step S170, the control device 170 adds the first external map information EMAP1 to the first map information MAP1.

When the determination processing (Step S133) is completed over the entire first update-permitted section, the external update processing (Step S130) ends.

5-3-2. Second Example

Figure 18:
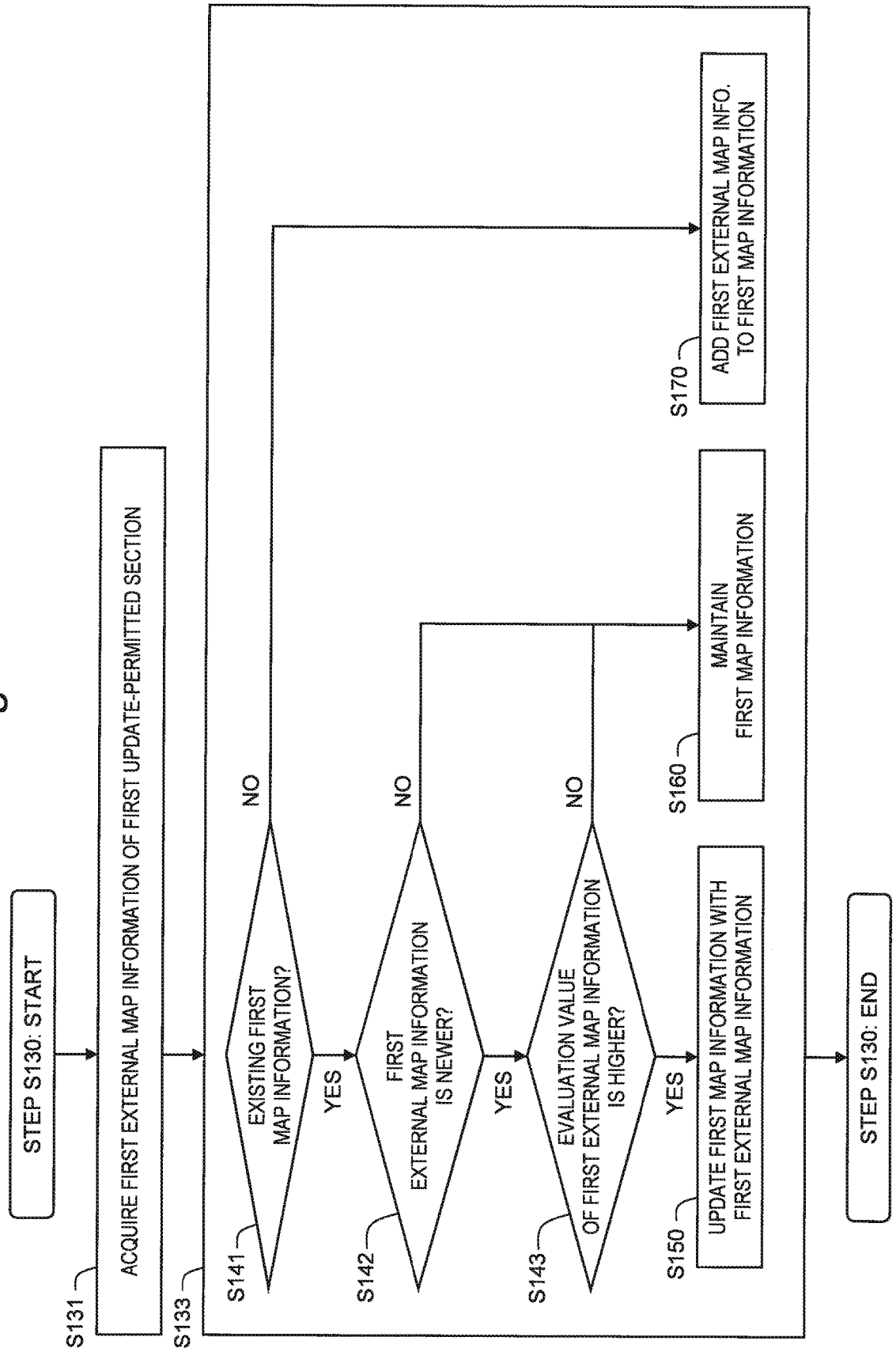
FIG. 18 is a flow chart showing a second example of the external update processing (Step S130) according to the embodiment of the present disclosure.

FIG. 18 is a flow chart showing a second example of the external update processing (Step S130). An overlapping description with the first example shown in FIG. 17 will be omitted as appropriate.

When the time stamp of the first external map information EMAP1 is newer than the time stamp of the first map information MAP1 (Step S142; Yes), the processing proceeds to Step S143 instead of Step S150.

In Step S143, the control device 170 compares the evaluation value of the first map information MAP1 and the evaluation value of the first external map information EMAP1. When the evaluation value of the first external map information EMAP1 is higher than the evaluation value of the first map information MAP1 (Step S143; Yes), the processing proceeds to Step S150. Otherwise (Step S143; No), the processing proceeds to Step S160.

According to the second example, the first map information MAP1 is prevented from being updated with the first external map information EMAP1 whose evaluation value is low. That is, deterioration in accuracy (quality) of the first map information MAP1 is prevented.

5-3-3. Third Example

Figure 19:
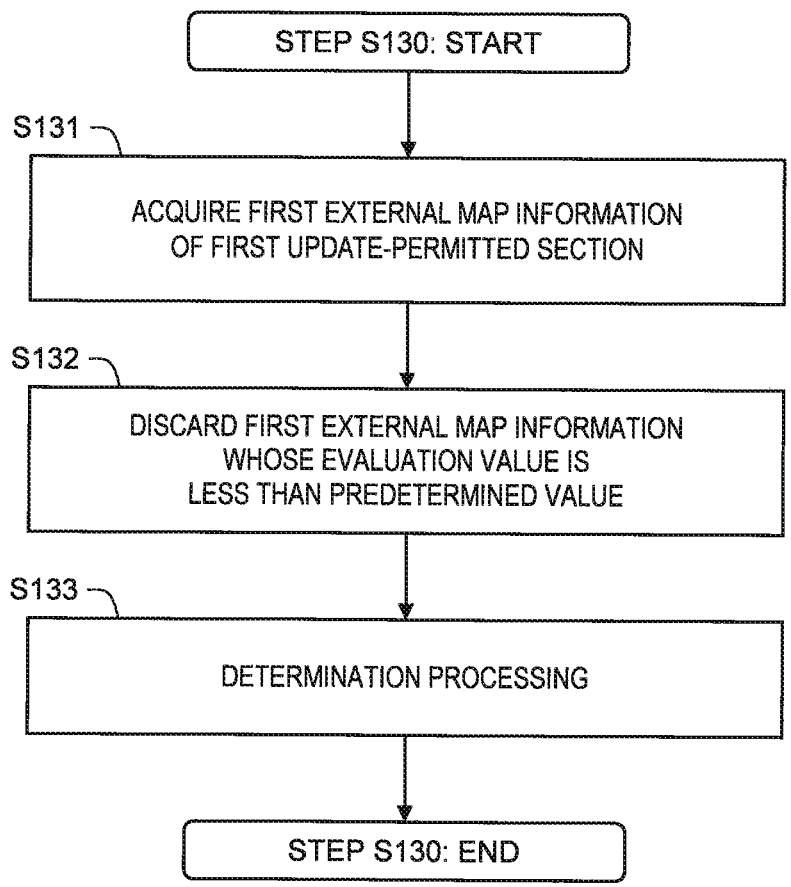
FIG. 19 is a flow chart showing a third example of the external update processing (Step S130) according to the embodiment of the present disclosure.

FIG. 19 is a flow chart showing a third example of the external update processing (Step S130). In the third example, Step S132 is added between Step S131 and Step S133.

In Step S132, the control device 170 discards the first external map information EMAP1 whose evaluation value is less than a predetermined value. After that, the processing proceeds to Step S133. Step S133 is the same as in any of the first example and the second example described above.

As a result of Step S132, the control device 170 executes the external update processing without using the first external map information EMAP1 whose evaluation value is less than the predetermined value. Therefore, the first map information MAP1 is prevented from being updated with the first external map information EMAP1 whose evaluation value is low. That is, deterioration in accuracy (quality) of the first map information MAP1 is prevented.

As another example, in the above-described Step S122 shown in FIG. 16, the update determination device 400 may classify a point or an area where the evaluation value of the first external map information EMAP1 is less than the predetermined value as the first update-prohibited section. Also in this case, the control device 170 executes the external update processing without using the first external map information EMAP1 whose evaluation value is less than the predetermined value. Therefore, the same effects can be obtained.

6. Processing Related to Map Update Processing by External Device

Figure 20:
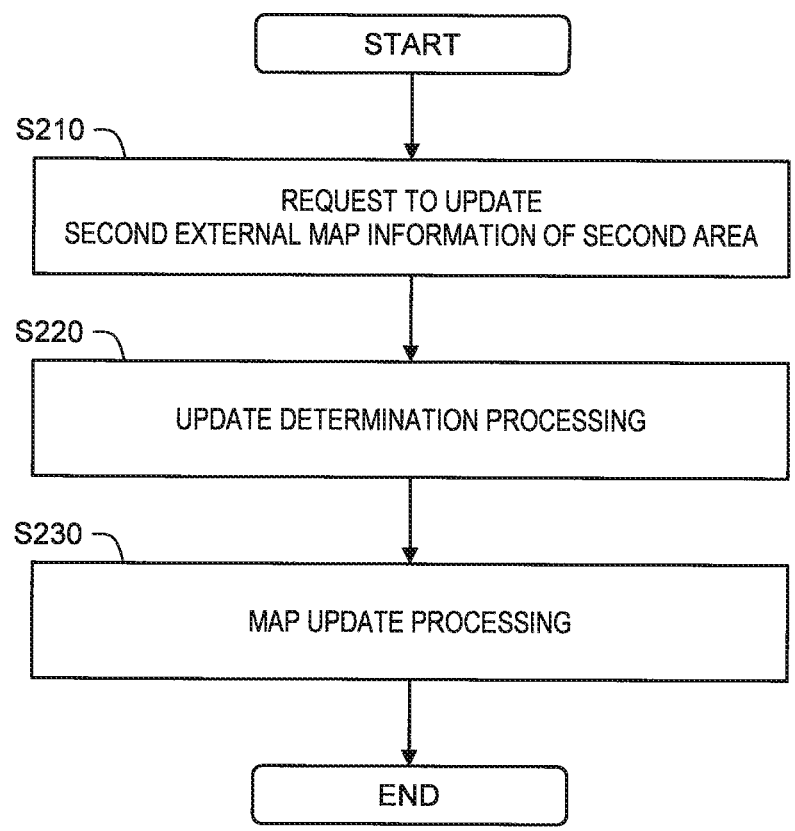
FIG. 20 is a flow chart showing processing related to map update processing by the external device according to the embodiment of the present disclosure.

FIG. 20 is a flow chart showing processing related to the map update processing by the external device 300 according to the present embodiment.

6-1. Step S210

The external device 300 or the control device 170 of the in-vehicle device 100 requests to update the second external map information EMAP2 of the second area. When the external device 300 requests the update, the external device 300 determines the second area and then sends an update request including information of the second area to the in-vehicle device 100 and the update determination device 400. When the control device 170 requests the update, the control device 170 determines the second area and then sends an update request including information of the second area to the external device 300 and the update determination device 400.

As an example, let us consider a case where the control device 170 executes the automated driving control. During the automated driving control, the control device 170 automatically updates the map information MAP by the internal update processing described above (see FIG. 14). After the vehicle 1 arrives at the destination, the control device 170 sets an actual travel route along which the vehicle 1 traveled and its surroundings as the second area. Then, the control device 170 sends the update request including information of the second area to the external device 300 and the update determination device 400.

6-2. Step S220

Figure 21:
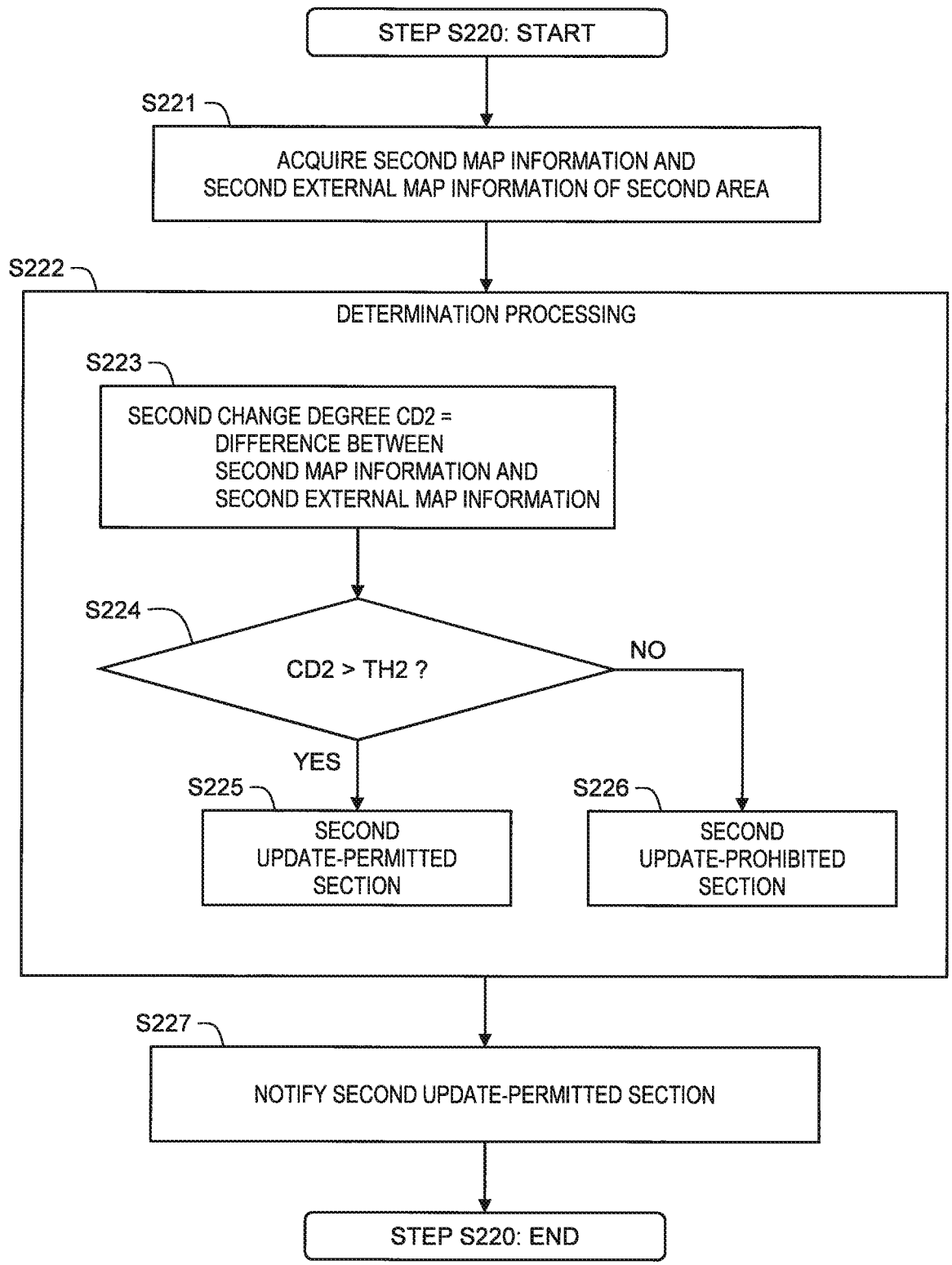
FIG. 21 is a flow chart showing update determination processing (Step S220) according to the embodiment of the present disclosure.

The update determination device 400 executes the update determination processing in response to the update request. FIG. 21 is flow chart showing the update determination processing (Step S220).

In Step S221, the update determination device 400 acquires the second external map information EMAP2 and the second map information MAP2 of the second area. Refer to the above-described Section 2-4 for the method of acquiring the second external map information EMAP2 and the second map information MAP2.

In Step S222, the update determination device 400 executes the following determination processing for each point or each area in the second area.

In Step S223, the update determination device 400 calculates the second change degree CD2 being a difference between the second external map information EMAP2 and the second map information MAP2. The calculation of the second change degree CD2 is similar to the calculation of the first change degree CD1.

In Step S224, the update determination device 400 compares the second change degree CD2 with the second threshold TH2. When the second change degree CD2 exceeds the second threshold TH2 (Step S224; Yes), the processing proceeds to Step S225. On the other hand, when the second change degree CD2 is equal to or less than the second threshold TH2 (Step S224; No), the processing proceeds to Step S226.

In Step S225, the update determination device 400 classifies the point or the area as the second update-permitted section.

In Step S226, the update determination device 400 classifies the point or the area as the second update-prohibited section.

It should be noted that in the above-mentioned Step S223, the second external map information EMAP2 or the second map information MAP2 may not yet exist. When the second external map information EMAP2 does not yet exist, the processing proceeds to Step S225 in order to newly register the second external map information EMAP2. On the other hand, when the second map information MAP2 does not yet exist, the processing proceeds to Step S226, because there is no need to update the second external map information EMAP2.

When the determination processing (Step S222) is completed over the entire second area, the processing proceeds to Step S227. In Step S227, the update determination device 400 notifies the external device 300 and the in-vehicle device 100 of the second update-permitted section.

6-3. Step S230

The external device 300 executes the map update processing in response to the update request. Various examples can be considered as a method of the map update processing.

6-3-1. First Example

Figure 22:
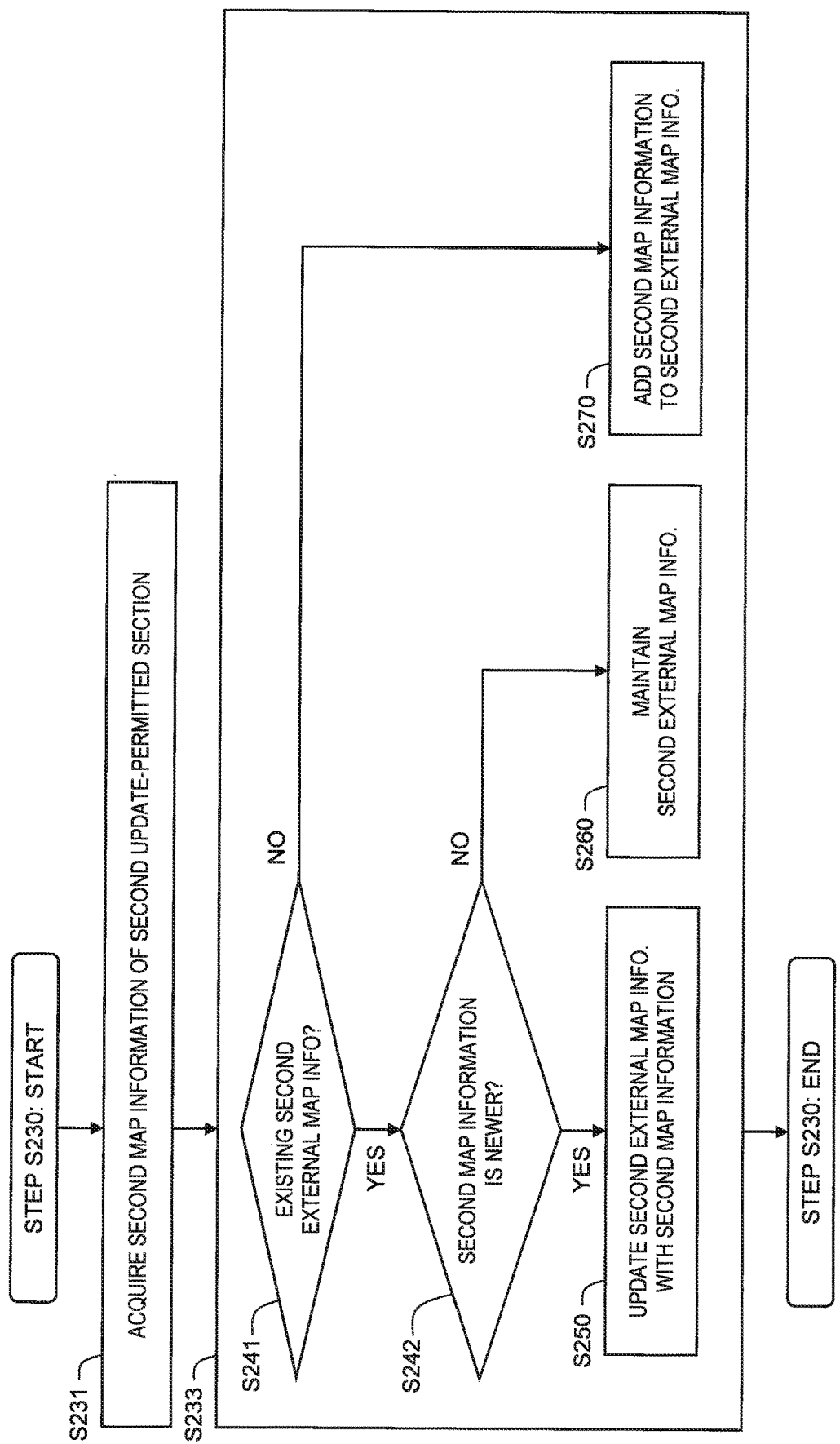
FIG. 22 is a flow chart showing a first example of the map update processing (Step S230) according to the embodiment of the present disclosure.

FIG. 22 is a flow chart showing a first example of the map update processing (Step S230).

In Step S231, the external device 300 acquires the second map information MAP2 of the second update-permitted section. In the case where the external device 300 serves as the update determination device 400 (see FIG. 9), the external device 300 extracts the second map information MAP2 of the second update-permitted section from the second map information MAP2 that is already acquired in the above-described Step S221. In the case where the control device 170 serves as the update determination device 400 (see FIG. 8), Step S231 is as follows. In the case where the external device 300 is the management server 300A shown in FIG. 5, the management server 300A acquires the second map information MAP2 of the second update-permitted section from the in-vehicle device 100 through the communication device 330. In the case where the external device 300 is the in-vehicle device 300B shown in FIG. 6, the in-vehicle device 300B acquires the second map information MAP2 of the second update-permitted section from the in-vehicle device 100 through the V2V communication.

In Step S233, the external device 300 executes the following determination processing for each point or each area in the second update-permitted section.

In Step S241, the external device 300 determines whether or not the second external map information EMAP2 already exists. When the second external map information EMAP2 already exists (Step S241; Yes), the processing proceeds to Step S242. On the other hand, when the second external map information EMAP2 does not yet exist (Step S241; No), the processing proceeds to Step S270.

In Step S242, the external device 300 compares the time stamp of the second external map information EMAP2 and the time stamp of the second map information MAP2. When the time stamp of the second map information MAP2 is newer than the time stamp of the second external map information EMAP2 (Step S242; Yes), the processing proceeds to Step S250. Otherwise (Step S242; No), the processing proceeds to Step S260.

In Step S250, the external device 300 updates (replaces) the second external map information EMAP2 with the second map information MAP2.

In Step S260, the external device 300 maintains the existing second external map information EMAP2 without updating it.

In Step S270, the external device 300 adds the second map information MAP2 to the second external map information EMAP2.

When the determination processing (Step S233) is completed over the entire second update-permitted section, the map update processing (Step S230) ends.

6-3-2. Second Example

Figure 23:
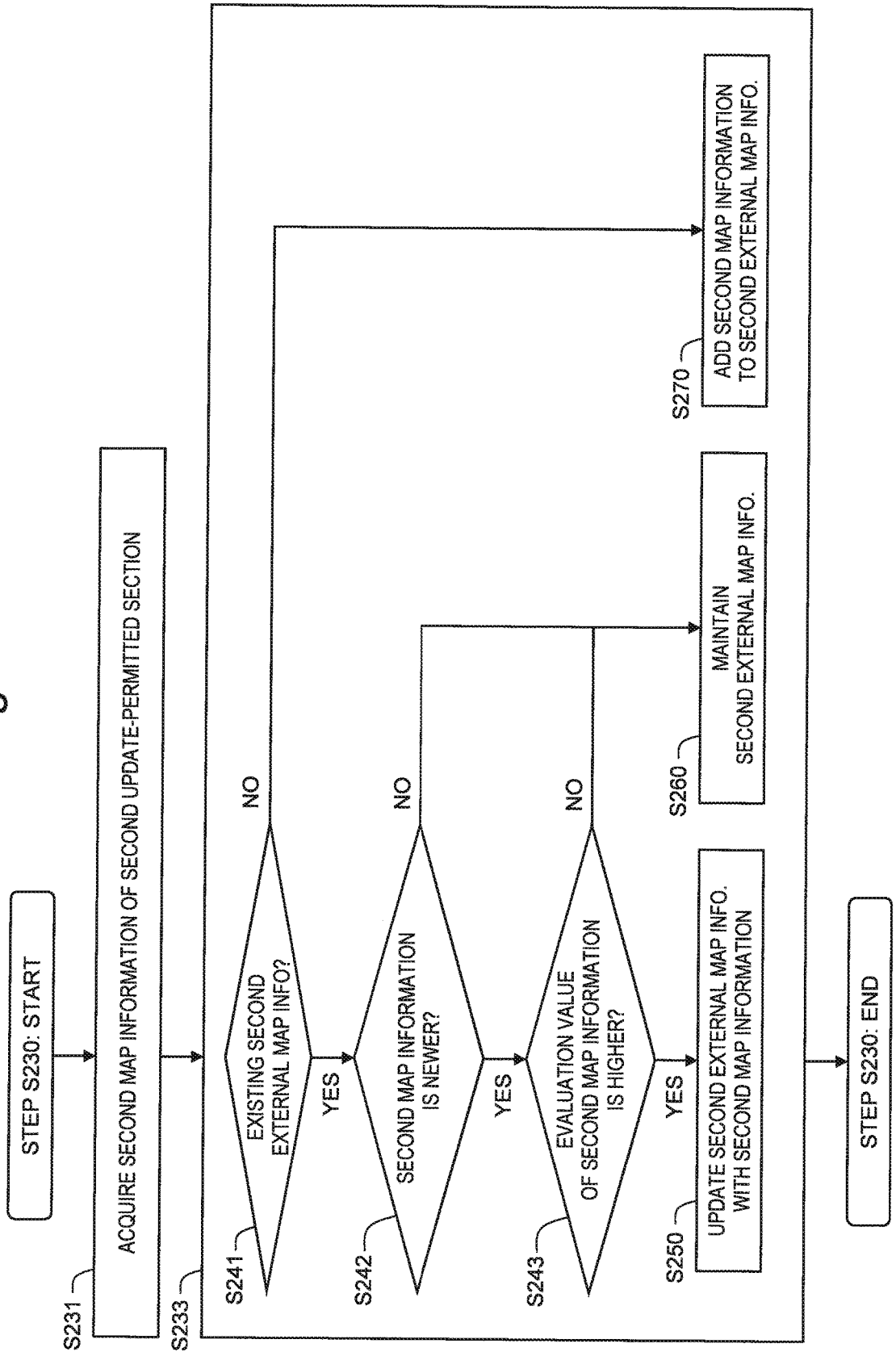
FIG. 23 is a flow chart showing a second example of the map update processing (Step S230) according to the embodiment of the present disclosure.

FIG. 23 is a flow chart showing a second example of the map update processing (Step S230). An overlapping description with the first example shown in FIG. 22 will be omitted as appropriate.

When the time stamp of the second map information MAP2 is newer than the time stamp of the second external map information EMAP2 (Step S242; Yes), the processing proceeds to Step S243 instead of Step S250.

In Step S243, the external device 300 compares the evaluation value of the second external map information EMAP2 and the evaluation value of the second map information MAP2. When the evaluation value of the second map information MAP2 is higher than the evaluation value of the second external map information EMAP2 (Step S243; Yes), the processing proceeds to Step S250. Otherwise (Step S243; No), the processing proceeds to Step S260.

According to the second example, the second external map information EMAP2 is prevented from being updated with the second map information MAP2 whose evaluation value is low. That is, deterioration in accuracy (quality) of the second external map information EMAP2 is prevented.

6-3-3. Third Example

Figure 24:
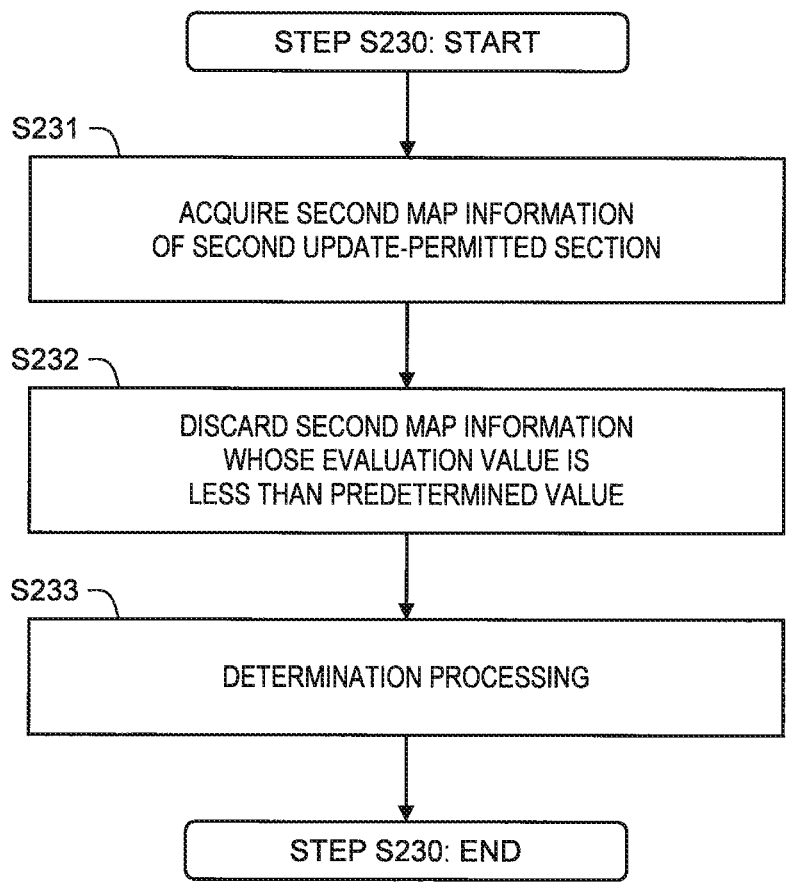
FIG. 24 is a flow chart showing a third example of the map update processing (Step S230) according to the embodiment of the present disclosure.

FIG. 24 is a flow chart showing a third example of the map update processing (Step S230). In the third example, Step S232 is added between Step S231 and Step S233.

In Step S232, the external device 300 discards the second map information MAP2 whose evaluation value is less than a predetermined value. After that, the processing proceeds to Step S233. Step S233 is the same as in any of the first example and the second example described above.

As a result of Step S232, the external device 300 executes the map update processing without using the second map information MAP2 whose evaluation value is less than the predetermined value. Therefore, the second external map information EMAP2 is prevented from being updated with the second map information MAP2 whose evaluation value is low. That is, deterioration in accuracy (quality) of the second external map information EMAP2 is prevented.

As another example, in the above-described Step S222 shown in FIG. 21, the update determination device 400 may classify a point or an area where the evaluation value of the second map information MAP2 is less than the predetermined value as the second update-prohibited section. Also in this case, the external device 300 executes the map update processing without using the second map information MAP2 whose evaluation value is less than the predetermined value. Therefore, the same effects can be obtained.

What is claimed is:

1. A map information system comprising:
    an in-vehicle device installed on a vehicle and configured to execute driving support control that supports driving of the vehicle based on map information;
    an external device having external map information used for the driving support control; and
    an update determination device capable of accessing the in-vehicle device and the external device, wherein
    each of the map information and the external map information includes a time stamp,
    the map information includes an evaluation value indicating certainty of the map information,
    the external map information includes an evaluation value indicating certainty of the external map information,
    the in-vehicle device comprises:
        a memory device in which the map information is stored; and
        a control device configured to execute the driving support control based on the map information stored in the memory device,
    the control device is further configured to execute external update processing that updates first map information being the map information of a first area by using first external map information being the external map information of the first area, and
    the update determination device is configured to:
        calculate a first change degree being a difference between the first map information and the first external map information, for each point or each area in the first area;
        prohibit the external update processing with respect to a first update-prohibited section in which the first change degree is equal to or less than a first threshold; and
        permit the external update processing with respect to a first update-permitted section in which the first change degree exceeds the first threshold, and
    when the time stamp of the first external map information is newer than the time stamp of the first map information and the evaluation value of the first external map information is higher than the evaluation value of the first map information, the control device updates the first map information with the first external map information.

2. The map information system according to claim 1, wherein
    the control device executes the external update processing without using the first external map information whose evaluation value is less than a predetermined value.

3. The map information system according to claim 1, wherein
    the in-vehicle device further comprises an information acquisition device configured to use a sensor to acquire driving environment information indicating driving environment for the vehicle, and
    the control device is further configured to execute internal update processing that updates the map information based on the driving environment information.

4. The map information system according to claim 3, wherein
    the external device is configured to execute map update processing that updates second external map information being the external map information of a second area by using second map information being the map information of the second area, and
    the update determination device is further configured to:
        calculate a second change degree being a difference between the second map information and the second external map information, for each point or each area in the second area;
        prohibit the map update processing with respect to a second update-prohibited section in which the second change degree is equal to or less than a second threshold; and
        permit the map update processing with respect to a second update-permitted section in which the second change degree exceeds the second threshold.

5. The map information system according to claim 4, wherein
    in the map update processing, the external device determines whether or not to update the second external map information, based on the time stamp of each of the second map information and the second external map information.

6. The map information system according to claim 5, wherein
when the time stamp of the second map information is newer than the time stamp of the second external map information, the external device updates the second external map information with the second map information.

7. The map information system according to claim 5, wherein
when the time stamp of the second map information is newer than the time stamp of the second external map information and the evaluation value of the second map information is higher than the evaluation value of the second external map information, the external device updates the second external map information with the second map information.

8. The map information system according to claim 4, wherein
the external device executes the map update processing without using the second map information whose evaluation value is less than a predetermined value.

* * * * *